(12) United States Patent
Hibst et al.

(10) Patent No.: US 8,673,497 B2
(45) Date of Patent: Mar. 18, 2014

(54) PROCESS FOR THE PREPARATION OF CRYSTALLINE LITHIUM-, IRON- AND PHOSPHATE-COMPRISING MATERIALS

(75) Inventors: Hartmut Hibst, Schriesheim (DE); Brian Roberts, South Euclid, OH (US); Jordan Keith Lampert, Ludwigshafen (DE); Kirill Bramnik, Mannheim (DE)

(73) Assignee: BASF SE, Ludwigshafen (DE)

( * ) Notice: Subject to any disclaimer, the term of this patent is extended or adjusted under 35 U.S.C. 154(b) by 307 days.

(21) Appl. No.: 12/988,222

(22) PCT Filed: Apr. 16, 2009

(86) PCT No.: PCT/EP2009/054486
§ 371 (c)(1),
(2), (4) Date: Oct. 15, 2010

(87) PCT Pub. No.: WO2009/127672
PCT Pub. Date: Oct. 22, 2009

(65) Prior Publication Data
US 2011/0037032 A1    Feb. 17, 2011

Related U.S. Application Data

(60) Provisional application No. 61/045,798, filed on Apr. 17, 2008.

(51) Int. Cl.
*H01M 4/58* (2010.01)
*C01B 25/30* (2006.01)

(52) U.S. Cl.
USPC ........ 429/221; 252/182.1; 423/311; 423/312; 429/231.6; 429/231.9; 429/231.95

(58) Field of Classification Search
USPC ............... 252/182.1; 429/221, 231.9, 231.95, 429/231.6, 229; 423/311, 312
See application file for complete search history.

(56) References Cited

U.S. PATENT DOCUMENTS

| 6,702,961 | B2 | 3/2004 | Barker et al. |
| 6,962,666 | B2 | 11/2005 | Ravet et al. |
| 2003/0082454 | A1 | 5/2003 | Armand et al. |
| 2004/0086784 | A1 | 5/2004 | Barker et al. |
| 2004/0175614 | A1 | 9/2004 | Wurm et al. |
| 2005/0117022 | A1 | 6/2005 | Marchant |
| 2006/0127767 | A1* | 6/2006 | Gauthier et al. ............ 429/221 |
| 2007/0207080 | A1* | 9/2007 | Yang ........................ 423/306 |
| 2009/0111024 | A1 | 4/2009 | Wurm et al. |
| 2009/0117022 | A1* | 5/2009 | Nuspl et al. ............... 423/306 |
| 2009/0233096 | A1 | 9/2009 | Schall et al. |
| 2010/0283012 | A1 | 11/2010 | Hibst et al. |
| 2010/0301281 | A1 | 12/2010 | Hibst et al. |
| 2012/0012797 | A1 | 1/2012 | Bramnik et al. |

FOREIGN PATENT DOCUMENTS

| CN | 1 547 273 | 11/2004 |
| CN | 1 837 032 | 9/2006 |
| DE | 10 2005 012640 | 9/2006 |
| DE | 10 2005 015613 | 10/2006 |
| EP | 1 391 424 | 2/2004 |
| WO | 02 099913 | 12/2002 |
| WO | 2004 082047 | 9/2004 |
| WO | 2006 057146 | 6/2006 |
| WO | 2006 116251 | 11/2006 |

OTHER PUBLICATIONS

U.S. Appl. No. 12/995,291, filed Nov. 30, 2010, Hibst, et al.
U.S. Appl. No. 13/379,048, filed Dec. 19, 2011, Schroedle, et al.
U.S. Appl. No. 12/988,418, filed Oct. 18, 2010, Hibst, et al.
International Search Report issued Aug. 20, 2009 in PCT/EP09/054486 filed Apr. 16, 2009.

* cited by examiner

*Primary Examiner* — Mark Kopec
*Assistant Examiner* — Haidung Nguyen
(74) *Attorney, Agent, or Firm* — Oblon, Spivak, McClelland, Maier & Neustadt, L.L.P.

(57) ABSTRACT

The present invention relates to a Process for the preparation of compounds of general formula (I), $Li_{a-b}M^1{}_bFe_{1-c}M^2{}_cP_{d-e}M^3{}_eO_x$, wherein $M^1$, $M^2$, $M^3$, a, b, c, d and e: $M^1$: Na, K, Rb and/or Cs, $M^2$: Mn, Mg, Ca, Ti, Co, Ni, Cr, V, $M^3$: Si, S, a: 0.8-1.9, b: 0-0.3, c: 0-0.9, d: 0.8-1.9, e: 0-0.5, x: 1.0-8, depending on the amount and oxidation state of Li, $M^1$, Fe, $M^2$, P, $M^3$, wherein compounds of general formula (I) are neutrally charged, comprising the following steps (A) providing a mixture comprising at least one lithium-comprising compound, at least one iron-comprising compound, in which iron has the oxidation state +3, and at least one $M^1$-comprising compound, if present, and/or at least one $M^2$-comprising compound, if present, and/or at least one $M^3$-comprising compound, if present, and at least one reducing agent which is oxidized to at least one compound comprising at least one phosphorous atom in oxidation state +5, (B) optionally drying the mixture provided in step (A), in order to obtain a solid compound and (C) calcining the solid compound obtained from step (A) or (B) at a temperature of 300 to 1000° C.

17 Claims, 5 Drawing Sheets

1000 : 1  20μm

5000 : 1  5μm

20000 : 1  1μm

PROCESS FOR THE PREPARATION OF CRYSTALLINE LITHIUM-, IRON- AND PHOSPHATE-COMPRISING MATERIALS

The present invention relates to a process for the preparation of compounds comprising lithium, iron and phosphate-anions, to a process for the preparation of mixtures comprising these compounds and at least one electrically conducting material, to the compounds and the mixtures, preparable by these processes and the use of these compounds and mixtures for the preparation of cathodes of lithium ion batteries.

Processes for the preparation of LiFePO$_4$ are already known from the prior art.

US 2003/0082454 A1 discloses a method for preparing LiFePO$_4$ by mixing Li$_2$CO$_3$ or LiOH.H$_2$O, Fe(CH$_3$CO$_2$)$_2$ and NH$_4$H$_2$PO$_4$.H$_2$O. The solid mixture is calcined at 300 to 350° C., in order to eliminate NH$_3$, H$_2$O and CO$_2$. The mixture is subsequently further processed under argon for 24 hours at 800° C. This document further mentions the method of preparing LiFePO$_4$ based material by calcination of a milled mixture comprising Li$_2$C$_2$O$_4$, LiH$_2$PO$_4$ and Fe(C$_2$O$_4$).2H$_2$O.

U.S. Pat. No. 6,962,666 B2 discloses a method for preparation of LiFePO$_4$ comprising a carbon-comprising coating, by calcination of a milled mixture consisting of 3% by weight of polypropylene-powder, Fe$_3$(PO$_4$)$_2$.8H$_2$O and Li$_3$PO$_4$ under argon. The mixture is calcined at 300° C. for 3 hours under argon to dehydrate Fe$_3$(PO$_4$)$_2$.8H$_2$O and is subsequently calcined for 7 hours at 700° C. The polypropylene-powder is a reducing agent to reduce Fe(III) in Fe$_3$(PO$_4$)$_2$.8H$_2$O to Fe(II) in LiFePO$_4$ and to produce carbon at the same time.

U.S. Pat. No. 6,702,961 B2 also discloses a method for the preparation of LiFePO$_4$ by pelletising a milled mixture consisting of FePO$_4$, Li$_2$CO$_3$ and carbon, followed by calcination at 700° C. for 8 hours in an inert atmosphere.

The abstract of CN 1547273 A discloses a method for the preparation of LiFePO$_4$ by calcination of a milled and subsequently tablettized mixture of Li$_2$CO$_3$, FeC$_2$O$_4$.2H$_2$O and (NH$_4$)$_2$HPO$_4$ with the addition of carbon under microwave radiation.

DE 10 2005 015613 A1 discloses that LiFePO$_4$ can be obtained by hydrothermal treatment of an aqueous mixture comprising FeSO$_4$.7H$_2$O, H$_3$PO$_4$ and LiOH.H$_2$O under nitrogen at 160° C. for 10 hours.

DE 10 2005 012 640 A1 discloses that LiFePO$_4$ can be obtained by hydrothermal treatment of precipitated Fe$_3$(PO$_4$)$_2$.8H$_2$O with Li$_3$PO$_4$ and Li$_2$SO$_4$ at 160° C. for 10 hours.

WO 2006/057146 A2 discloses that LiFePO$_4$ can be obtained by melting a mixture comprising FeO, P$_2$O$_5$ and LiOH at 1100° C. under argon, followed by milling.

The processes for the preparation of LiFePO$_4$ according to the prior art bear the draw-back that an additional reducing agent like carbon has to be added to the reaction mixture or that the calcination step has to be conducted in a reducing atmosphere. Because the added carbon acts as a reducing agent only at high reaction temperatures, high calcination temperatures are necessary which lead to a material with large crystal grains and with a broad particle size distribution. Other disadvantages are that if solid compounds like Li$_2$CO$_3$ and Fe$_2$O$_3$ are mixed in solid phase, it is difficult to obtain a mixture having a homogenous dispersion of the different ions throughout the whole mixture. In addition, carbon containing reducing agents show the disadvantage that their reducing power is not independent from the amount in which they are used, and therefore it is not easy to foresee which amount of carbon containing reducing agent is needed for the reduction and which amount can be used as electrically conducting material.

The object of the present invention is to provide a process for the preparation of lithium-iron-phosphate which makes it possible to obtain these compounds in a very homogenously mixed and crystalline state. In addition, it is an object of the present invention to provide a process for the preparation of the mentioned compounds which can be conducted easily and with only a few reaction steps. Moreover, it is object of the present invention to provide a process for the preparation of lithium-iron-phosphate, in which the applied calcination temperature can be decreased to 400° C. or less to prepare a single-phase lithium-iron-phosphate. It is therefore a further object to obtain a more fine dispersed material with a very narrow size distribution of the crystallites, supplying improved Li-ion diffusivity in the charging and discharging of a Li-ion battery, in order to improve the Li-ion diffusivity and therewith the power characteristics and additionally to increase the capacity of a Li-ion battery. It is a further object to obtain a material with morphology of porous spheres in which a plurality of crystalline primary particles are aggregated.

These objects are achieved by a process for the preparation of compounds of general formula (I)

$$Li_{a-b}M^1{}_bFe_{1-c}M^2{}_cP_{d-e}M^3{}_eO_x \qquad (I),$$

wherein M$^1$, M$^2$, M$^3$, a, b, c, d and e:
M$^1$: Na, K, Rb and/or Cs,
M$^2$: Mn, Mg, Ca, Ti, Co, Ni, Cr and/or V,
M$^3$: Si and/or S,
a: 0.8-1.9,
b: 0-0.3,
c: 0-0.9,
d: 0.8-1.9,
e: 0-0.5,
x: 1.0-8, depending on the amount and oxidation state of Li, M$^1$, Fe, M$^2$, P, M$^3$, wherein compounds of general formula (I) are neutrally charged,
comprising the following steps
(A) providing a mixture comprising at least one lithium-comprising compound, at least one iron-comprising compound, in which iron has the oxidation state +3, and at least one M$^1$-comprising compound, if present, and/or at least one M$^2$-comprising compound, if present, and/or least one M$^3$-comprising compound, if present, and at least one reducing agent which is oxidized to at least one compound comprising at least one phosphorous atom in oxidation state +5,
(B) optionally drying the mixture provided in step (A), in order to obtain a solid compound and
(C) calcining the solid compound obtained from step (A) or (B) at a temperature of 300 to 1000° C.

In a preferred embodiment, M$^1$, M$^2$, M$^3$, a, b, c, d, e and x have the following meanings:
M$^1$: Na,
M$^2$: Mn, Mg, Ca, Ti, Co, Ni,
M$^3$: Si, S
a: 0.6-1.6, particularly preferred 0.9-1.3,
b: 0-0.1,
c: 0-0.6, particularly preferred 0-0.3
d: 0.6-1.6, particularly preferred 0.9-1.3
e: 0-0.3, particularly preferred 0-0.1
x: 2-6, depending on the amount and oxidation state of Li, M$^1$, Fe, M$^2$, P, M$^3$, wherein compounds according to general formula (I) are neutrally charged.

For example, in a very preferred embodiment, $M^1$, $M^2$ and $M^3$ are absent, in order to have a neutrally charged compound of general formula (I) $LiFePO_4$, in which Fe is in oxidation state +2. Therefore, in a very preferred embodiment, the process according to the present invention is conducted in order to obtain the compound of formula $LiFePO_4$.

In further preferred embodiments, $M^1$, being for example Na, is present in an amount of up to 10 mol %, in respect of the sum of Li and $M^1$. In another preferred embodiment, $M^2$, being for example Mn, is present in an amount of up to 30 mol %, in respect of the sum of iron (II) and $M^2$ present in the compound. In another preferred embodiment, $M^3$, being for example Si, is present in an amount of up to 10 mol %, in respect of the sum of phosphorous and $M^3$.

Process steps (A), (B) and (C) are explained in the following in more detail:

Step (A):

Step (A) of the process according to the present invention comprises providing a mixture comprising at least one lithium-comprising compound, at least one iron-comprising compound, in which iron has the oxidation state +3, and at least one $M^1$-comprising compound, if present, and/or at least one $M^2$-comprising compound, if present, and/or at least one $M^3$-comprising compound, if present, and at least one reducing agent which is oxidized to at least one compound comprising at least one phosphorous atom in oxidation state +5.

In a preferred embodiment the mixture which is provided in step (A) of the process according to the present invention is essentially aqueous.

In general, all Li—, $M^1$-, $M^2$- and $M^3$-comprising compounds known to a person having ordinary skill in the art which are able to be incorporated in an essentially aqueous mixture in step (A) of the process can be used in the process according to the present invention.

The Li-comprising compound in step (A) is preferably chosen from the group consisting of lithium hydroxide LiOH, lithium hydroxide-hydrate $LiOH.H_2O$, lithium acetate LiOAc, lithium carbonate $Li_2CO_3$, lithium-phosphates, like $LiH_2PO_4$, $Li_2HPO_4$, $Li_3PO_4$, $LiH_2PO_3$, $Li_2HPO_3$, $Li_3PO_3$ and/or $LiH_2PO_2$, and mixtures thereof. In a very preferred embodiment, lithium hydroxide LiOH and/or lithium hydroxide-hydrate $LiOH.H_2O$ and/or lithium carbonate $Li_2CO_3$ are used as lithium-comprising compounds in step (A) of the process according to the present invention. Two particularly preferred lithium-comprising compounds are lithium hydroxide LiOH and lithium hydroxide-hydrate $LiOH.H_2O$.

The at least one lithium-comprising compound is added to the mixture in step (A) in the process according to the present invention in a concentration of in general 0.04 to 3 mol Li/L, preferably 0.2 to 2.0 mol Li/L, particularly preferred 0.3 to 1.5 mol Li/L, based on the whole reaction mixture in each case.

In general, all iron-comprising compounds in which iron has the oxidation state +3, known to a person having ordinary skill in the art can be used in the process according to the present invention which are able to be incorporated in an essentially aqueous mixture in step (A) of the process. According to the present invention, a single iron-comprising compound in which iron has the oxidation state +3, or a mixture of different iron-comprising in which iron has the oxidation state +3 can be used. It is also possible that an iron-comprising compound is used in which both, iron in oxidation state +2 and +3 is present, like for example $Fe_3O_4$. It is also possible that a mixture of different iron-comprising compounds is used comprising one compound in which iron has the oxidation state +3 and another compound in which iron has the oxidation state +2.

In a preferred embodiment, the iron-comprising compound in which iron has the oxidation state +3 is chosen from the group consisting of iron (II,III)-oxide, iron(III)-oxide, iron (III)-oxide hydroxide, or iron hydroxide, for example $Fe_3O_4$, $\alpha$-$Fe_2O_3$, $\gamma$-$Fe_2O_3$, $\alpha$-FeOOH, $\beta$-FeOOH, $\gamma$-FeOOH and $Fe(OH)_3$. Preferred are the $\alpha$-, $\beta$- and $\gamma$-modification of iron (III)-oxide hydroxide (FeOOH), particularly preferred are the $\alpha$- and $\gamma$-modification of iron(III)-oxide hydroxide (FeOOH), $\alpha$-FeOOH is especially preferred.

In a preferred embodiment, the iron-comprising compound, preferably $\alpha$-FeOOH, $\beta$-FeOOH or $\gamma$-FeOOH, is present in a needle-shaped habitus, particularly preferred having a ratio of length to thickness of >1.5, preferably >2, particularly preferred >5.

The advantage of the use of FeOOH, preferably in a needle-shaped habitus, is that in the mixture comprising at least one lithium-comprising compound, at least one phosphorous comprising compound, very short diffusion pathways are present which make it possible to obtain the compound according to general formula (I) very homogeneously and in a single phase. The Fe(III)-cations can easily move between lithium and phosphorous atoms in order to reach the right places in the crystal, which is not that easy, if different Fe-containing compounds are used.

The at least one iron-comprising compound is added to the mixture in step (A) in the process according to the present invention in a concentration of in general 0.04 to 4.0 mol Fe/L, preferably 0.1 to 2.0 mol Fe/L, particularly preferred 0.2 to 1.5 mol Fe/L, based on the whole reaction mixture in each case.

The at least one $M^1$-comprising compound, if present, is preferably chosen from the group consisting of sodium hydroxide NaOH, sodium hydroxide-hydrate $NaOH.H_2O$, sodium acetate NaOAc, sodium carbonate $Na_2CO_3$, and mixtures thereof. In a very preferred embodiment, sodium hydroxide NaOH and/or sodium hydroxide-hydrate $NaOH.H_2O$ and/or sodium carbonate $Na_2CO_3$ are used as sodium-comprising compounds in step (A) of the process according to the present invention. Two particularly preferred sodium-comprising compounds are sodium hydroxide NaOH and sodium hydroxide-hydrate $NaOH.H_2O$.

The at least one $M^2$-comprising compound, if present, is preferably chosen from compounds having the required cation and an anion chosen from hydroxide, acetate, oxide, carbonate, halogenide, like fluoride, chloride, bromide, iodide, nitrate, and mixtures thereof. In a very preferred embodiment, the anion of the at least one $M^2$-comprising compound is acetate, oxide, hydroxide, carbonate, nitrate, or mixtures thereof.

The at least one $M^3$-comprising compound, if present, is preferably chosen from $H_2SO_4$, $(NH_4)HSO_4$, $(NH_4)_2SO_4$, $LiHSO_4$, $Li_2SO_4$, finely divided $SiO_2$, e.g. in form of a sol, $H_4SiO_4$, Li-silicate, and mixtures thereof.

$M^1$-, $M^2$-, and/or $M^3$-comprising compounds are added to the essentially aqueous mixture, if present, in amounts, in which they are present in compounds of formula (I). A person having ordinary skill in the art knows how to calculate the required amount.

The process according to the present invention is preferably conducted by introducing at least one reducing agent into the mixture in step (A) of the process according to the present invention, which is oxidized to at least one compound comprising at least one phosphorous atom in oxidation state +5 during the process according to the present invention. The use of at least one reducing agent, which is oxidized to at least one compound comprising at least one phosphorous atom in oxidation state +5 has the advantage that the oxidation product of this reducing agent gives rise to $PO_4^{3-}$-anions, which are needed in order to obtain the $PO_4^{3-}$-comprising compound of general formula (I).

In a preferred embodiment, the at least one reducing agent that is oxidized to at least one compound comprising at least one phosphorous atom in oxidation state +5, is carbon free. According to the present invention, carbon free means that no carbon atoms are present in the phosphorous-containing reducing agent. An advantage of a carbon free reducing agent, like $H_3PO_3$, is that the reduction can be conducted at low temperatures like 300 or 350° C., whereas carbon as reducing agent makes temperatures necessary of 600° C. and higher. These low temperatures make it possible to obtain nanocrystalline materials. Nano-crystalline materials can not be obtained advantageously at high temperatures which are in general necessary if carbon is used as the reducing agent.

In a preferred embodiment, the at least one reducing agent which is oxidized to at least one compound comprising at least one phosphorous atom in oxidation state +5 is chosen from the group consisting of $H_3PO_3$, $(NH_4)H_2PO_3$, $(NH_4)_2HPO_3$, $H_3PO_2$, $(NH_4)H_2PO_2$, $(NH_4)_2HPO_2$, $LiH_2PO_3$, $Li_2HPO_3$, $Li_2PO_2$ and mixtures thereof. In a particularly preferred embodiment $H_3PO_3$, $(NH_4)H_2PO_3$, $(NH_4)_2HPO_3$ are used, a very preferred reducing agent is $H_3PO_3$.

The at least one reducing agent which is oxidized to at least one compound comprising at least one phosphorous atom in oxidation state +5 is added to the mixture in step (A) in the process according to the present invention in a concentration of in general 0.04 to 2.0 mol P/L, preferably 0.1 to 1.3 mol P/L, particularly preferred 0.15 to 1.0 mol P/L, based on the whole reaction mixture in each case.

According to the present invention at least one reducing agent which is oxidized to at least one compound comprising at least one phosphorous atom in oxidation state +5 is added to the reaction mixture in step (A) of the process according to the present invention. The reducing agent that is used in the process according to the present invention will preferably be oxidized to $PO_4^{3-}$. If the at least one reducing agent which is oxidized to at least one compound comprising at least one phosphorous atom in oxidation state +5 is added to the reaction mixture in a preferably at least equimolar amount, particularly preferred in an equimolar amount, $PO_4^{3-}$ is obtained as the oxidizing product in an amount high enough to be the complete amount of phosphate-anion of the compound of general formula (I). According to this embodiment no compound having at least one phosphorous atom in oxidation state +5 has to be added.

In another preferred embodiment of the present application the mixture which is provided in step (A) additionally comprises at least one compound comprising at least one phosphorous atom in oxidation state +5. In this preferred embodiment of the present invention a combination of at least one reducing agent which is oxidized to at least one compound comprising at least one phosphorous atom in oxidation state +5 and at least one compound comprising at least one phosphorous atom in oxidation state +5 is added to the reaction mixture in step (A) of the process according to the present invention. The reducing agent that is used in the process according to the present invention will preferably be oxidized to $PO_4^{3-}$. In this embodiment of the process according to the present application, $PO_4^{3-}$ that is obtained as the oxidizing product is not present in an amount high enough to be the complete amount of phosphate-anion of the compound of general formula (I). Therefore, in this embodiment, at least one compound having at least one phosphorous atom in oxidation stage +5 has to be added. This at least one compound comprising at least one phosphorous atom in oxidation state +5 will be the second source of $PO_4^{3-}$-anions, which have to be incorporated into the compound of general formula (I).

Preferred compounds comprising at least one phosphorous atom in oxidation state +5 which are optionally added in step (A) are chosen from the group consisting of $H_3PO_4$, $(NH_4)H_2PO_4$, $(NH_4)_2HPO_4$, $(NH_4)_3PO_4$, $Li_3PO_4$, $LiH_2PO_4$, $Li_2HPO_4$ and mixtures thereof. Particularly preferred are $H_3PO_4$, $(NH_4)H_2PO_4$, $(NH_4)_2HPO_4$ and mixtures thereof, very preferred is $H_3PO_4$.

The at least one compound comprising at least one phosphorous atom in oxidation state +5 is added to the mixture in step (A) in the process according to the present invention in a concentration of in general 0.02 to 1.0 mol P/L, preferably 0.05 to 0.65 mol P/L, particularly preferred 0.1 to 0.5 mol P/L, based on the whole reaction mixture in each case.

If compounds are used in the process according to the present invention that bear two functionalities in respect of the present process, like for example compounds that comprise a lithium-cation and a $PO_4^{3-}$- or $PO_3^{3-}$-anion, the amounts of these compounds are adjusted in a way that all necessary components are present in the reaction mixture in amounts that are suitable for obtaining the compound according to general formula (I). A person having ordinary skill in the art does know how to calculate these amounts.

In a further preferred embodiment, in addition to the at least one reducing agent which is oxidized to at least one compound comprising at least one phosphorous atom in oxidation state +5 and optionally at least one compound comprising at least one phosphorous atom in oxidation state +5, at least one additional reducing agent is added to the mixture in step (A) of the process according to the present invention. The additional reducing agent may also be carbon-free or may contain carbon.

The at last one additional reducing agent is preferably chosen from hydrazine or derivatives thereof, hydroxylamine or derivatives thereof, reducing sugars, like glucose, saccharose (succhrose) and/or lactose, alcohols like aliphatic alcohols having 1 to 10 carbon atoms, like methanol, ethanol, propanols, for example n-propanol or isopropanol, butanols, for example n-butanol, iso-butanol, ascorbic acid, and compounds comprising easily oxidisable double bonds, and mixtures thereof.

Examples of derivatives of hydrazine are hydrazine-hydrate, hydrazine-sulfate, hydrazine-dihydrochloride and others. An example of a derivative of hydroxylamine is hydroxyl amine-hydrochloride. Particularly preferred carbon-free reducing agents which are not oxidized to at least one compound comprising at least one phosphorous atom in oxidation state +5 are hydrazine, hydrazine-hydrate, hydroxylamine or mixtures thereof.

The at least one reducing agent which is optionally added is on the one hand by nature not able to deliver $PO_4^{3-}$-anions as oxidation products which can be incorporated into the compound of general formula (I). On the other hand the at least one reducing agent does not have the total reductive potential to reduce the Fe(III) precursor fully into Fe(II). Therefore, if at least one of these additional reducing agents is used, it is also necessary to use these reducing agents in combination with at least one compound which is oxidized to a compound comprising at least one phosphorous atom in oxidation state +5 and optionally at least one compound comprising at least one phosphorous atom in oxidation state +5 in order to obtain compounds of general formula (I) having the advantageous electrochemical characteristics and microstructure according to the present invention. In these cases the amount and the concentrations of the at least one compound which is oxidized to at least one compound comprising at least one phosphorous atom in oxidation state +5, optionally at least one compound comprising at least one phosphorous atom in oxidation state +5 and optionally at least one additionally reducing agent, which are added in step (A) have to be adjusted accordingly. A person having ordinary skill in the art does know how the respective amounts have to be calculated.

The at least one additional reducing agent is optionally added to the mixture in step (A) in the process according to the present invention in a concentration which depends strongly on the reducing power and reducing potential of this agent. A person having ordinary skill in the art does know how the respective amount has to be calculated.

If a combination of at least one reducing agent which is oxidized to a compound comprising at least one phosphorous compound in oxidation state +5, preferably $H_3PO_3$, and at least one compound comprising at least one phosphorous atom in oxidation state +5, preferably $H_3PO_4$, is added in step (A) of the process according to the present invention, this combination is preferably added in a ratio, for example, $H_3PO_3/H_3PO_4$, which is larger than the ratio that is necessary to obtain the desired compound according to general formula (I), to overcome oxidative influences within the synthesis route, e.g. within the preparation of the slurry in the presence of oxygen, within the spray-drying of the slurry in the presence of oxygen, and/or within the calcination of the spray-dried powder in the presence of oxygen impurities. A person having ordinary skill in the art does know how to calculate the stoichiometric amounts of the components in the mixture of step (A) according to the present invention.

In a preferred embodiment, the at least one lithium-comprising compound, the at least one iron-comprising compound, in which iron has the oxidation state +3, the at least one reducing agent which is oxidized to at least one compound comprising at least one phosphorous atom in oxidation state +5, and optionally the at least one compound comprising at least one phosphorous atom in oxidation state +5, are added to the essentially aqueous mixture in amounts that are adjusted in a way that the stoichiometry according to general formula (I) is obtained. A person having ordinary skill in the art does know how to calculate the necessary amounts. In another preferred embodiment of the present invention, the at least one lithium-comprising compound is added in an amount that is ≥1% by weight, preferably ≥2% higher than the stoichiometric amount according to general formula (I).

In one embodiment of the process according to the present invention the components which are present in the mixture that is provided in step (A) are mixed in dry state by intimately milling. A person having ordinary skill in the art does know how this intimate milling can be obtained and which apparatuses like mills can be used.

The mixture which is provided in step (A) of the process according to the present invention is, in a preferred embodiment, essentially aqueous. The wording "essentially" according to the present invention has the meaning that more than 50% by weight, preferably more than 65% by weight, particularly preferably more than 80% by weight of the solvent, which is used to provide the essentially aqueous mixture in step (A) of the process according to the present invention, is water.

In addition to water, further solvents that are miscible with water can be present. Examples of these solvents are aliphatic alcohols having 1 to 10 carbon atoms like methanol, ethanol, propanols, for example n-propanol or iso-propanol, butanols, for example n-butanol, iso-butanol. According to the present invention, alcohols can be added as additional reducing agent and/or as additional solvent.

In a very preferred embodiment, the solvent that is used in step (A) of the process according to the present invention is water without any additional solvents.

The order, in which the different components are added to the solvent or mixture of solvents in step (A), is not determined. In a preferred embodiment, the lithium-comprising compound is added first to the solvent, the iron-comprising compound, in which iron has oxidation state +3, is added as the second component. The at least one reducing agent and optionally the at least one compound having at least one phosphorous atom having the oxidation state +5, and optionally the at least one additional reducing agent, are added subsequently.

In a preferred embodiment of the present invention, the mixture obtained from step (A) of the process according to the present invention is an essentially aqueous solution of at least one lithium-comprising compound, at least one iron-comprising compound, in which iron has the oxidation state +3, at least one reducing agent which is oxidized to at least one compound comprising at least one phosphorous atom in oxidation state +5, optionally in combination with at least one compound comprising at least one phosphorous atom in oxidation state +5.

When conducted in an essentially aqueous way, step (A) can be conducted in all suitable reactors that are known to a person skilled in the art. Step (A) can be conducted continuously or discontinuously.

The temperature, under which step (A) of the process according to the present invention is conducted in an essentially aqueous way is 10 to 120° C., preferably 60 to 100° C., particularly preferably 40 to 95° C. If temperatures higher than 100° C. are used, the reaction mixture has to be present in a pressure-resistant reactor, because of the boiling point of water. To increase the homogeneity of the mixture, mixing is conducted at elevated temperature and optionally under the application of shearing force, for example by the use of an ultrathurax.

In a preferred embodiment the mixture is stirred in step (A) for a time of 0.05 to 80 hours, particularly preferred 0.5 to 20 hours. The pH-value of the mixtures to the end of stirring is in general below pH 11, preferably below pH 10, for example at 2.0 to 8.0.

Step (A) of the process according to the present invention can be conducted under air or under an inert atmosphere. Examples of inert gases are nitrogen, noble gases like helium or argon. In a preferred embodiment, step (A) is conducted under a nitrogen atmosphere.

Reduction of most of the $Fe^{3+}$ to $Fe^{2+}$ is in general conducted in step (B) and/or step (C), preferably in step (C), of the process according to the present invention. It is also possible that reduction immediately starts in step (A) after addition of the reducing agent in the aqueous mixture. It is further possible that reduction starts after the aqueous mixture is heated to an increased temperature of 40 to 100° C., preferably 60 to 95° C. In another preferred embodiment, if a combination of two P-comprising compounds is used as the reducing agent, for example $H_3PO_3/H_3PO_4$, the reduction starts, when both components are added.

Step (B):

Optional step (B) of the process according to the present invention comprises drying the mixture provided in step (A), in order to obtain a solid compound, if an aqueous mixture is provided in step (A). Even if not an aqueous mixture is provided in step (A), drying step (B) can be conducted. Because preferably an essentially aqueous mixture is provided in step (A), step (B) is preferably conducted.

In step (B), the essentially aqueous mixture obtained from step (A) is converted into a solid compound. The drying of the mixture provided in step (A) of the process according to the present invention can be conducted with all methods known to a person having ordinary skill in the art and which are suitable for the removal of water of an aqueous mixture of the components as mentioned above.

Preferred methods for drying the mixture from step (A) in step (B) are spray-drying, freeze-drying or combinations thereof. According to the present invention, the drying in step (B) can be conducted only by spray-drying, only by freeze-drying or by a combination of the spray-drying and freeze-drying, in both orders. Step (B) of the process according to the present invention is preferably conducted by spray-drying. Spray-drying in step (B) preferably causes that spherical agglomerates of the compound of general formula (I), preferably $LiFePO_4$, are obtained.

Spray-drying is in general conducted by passing the mixture obtained from step (A) through one or more narrow nozzles, wherein fine drops are being obtained which are dried by a stream of hot air or nitrogen or hot mixtures of air, nitrogen, pure oxygen, argon, helium, hydrogen, preferably hot air or hot nitrogen or a hot mixture of air and nitrogen and optionally oxygen, particularly preferred hot air, which is preferred. Alternatively the spraying can be achieved via a rotating disc, which is preferred. In a preferred embodiment a stream of hot air or nitrogen is used having a temperature of 100 to 500° C., particularly preferred 110 to 350° C. Spray-drying is normally conducted directly with the mixture of step (A) without any intermediate steps. Spray-drying normally gives rise to spherical agglomerates having an average diameter of <0.5 mm, e.g. 15-300 μm, preferably 20-200 μm, particularly preferred 30-150 μm. In order to obtain comparably small spherical agglomerates having an average diameter of 3-50 μm in a preferred embodiment of step (B) diluted solutions can be used and spray-drying of these diluted solutions can be conducted using high pressure nozzles. To increase the dilution of the solution, in general additional water is added.

In a second embodiment, step (B) of the process according to the present invention is conducted by freeze-drying. The sprayed mixture is therefore sprayed into, for example liquid nitrogen. The spherical particles and agglomerates obtained therefrom can be dried in vacuum at a low temperature.

The drying in step (B) is conducted in order to obtain a dry solid. In a preferred embodiment, the drying in step (B) of the process according to the present invention is conducted in order to obtain a solid having an amount of water present in the solid of less than 50% by weight, preferably less than 35% by weight, particularly preferably less than 25% by weight.

After step (B) the desired solid is present in preferably spherical agglomerates having a diameter of 3 to 300 μm, preferably 6 to 200 μm, very preferably 10 to 150 μm.

Step (C):

Step (C) of the process according to the present invention comprises calcining the solid compound obtained from step (B) at a calcination temperature of 300 to 1000° C. Step (C) is preferably conducted at a calcination temperature of 375 to 900° C., particularly preferably at a calcination temperature of 400 to 850° C., for example 450 to 800° C.

Calcination is in general conducted under an inert gas atmosphere. Examples of inert gases are nitrogen, technical nitrogen comprising traces of oxygen or noble gases like helium and/or argon. In a preferred embodiment, nitrogen is used in step (C) of the process according to the present invention. If technical nitrogen is used in step (C) of the present invention, this nitrogen can comprise traces of oxygen.

One advantage of the process according to the present invention is that calcination can be conducted under an inert atmosphere and no need exists to conduct step (C) under a reducing atmosphere according to the prior art. Based thereon the process according to the present invention can be conducted in a more time and cost saving way. The absence of a gaseous reducing agent, for example hydrogen, avoids the presence of explosive gaseous mixtures. If the nitrogen used in the calcination step comprises higher amounts of oxygen, it is possible to add reducing gases like CO or hydrogen to the oxygen comprising nitrogen.

Step (C) of the process according to the present invention is conducted for a time of 0.1 to 8 hours, preferably 0.5 to 3 hours. In a preferred embodiment of step (C), the calcination temperature is hold for a period of 0.1 to 2 hours, very preferably 0.5 to 1.5 hours, and at the end the temperature is decreased to room temperature.

In a preferred embodiment, the product obtained from step (C) consists essentially of spherical agglomerates having a diameter of 3 to 300 μm, preferably 6 to 200 μm, very preferred 10 to 150 μm. An investigation with different analytical tools like SEM or TEM shows, that the spherical agglomerates consist of crystalline primary particles and, in addition, comprise pores. The amount of porosity is depending on different criteria like smallness of the FeOOH particles, ratio between length and width of the needle shaped FeOOH particles, concentration of the slurry that is prepared in step (A), speed of spray-drying in step (B), which is further depending on the temperature of the gas used, and in addition configuration of the spray-tower used. Total porosity in the spherical agglomerates is in general 3-85%, preferably 5-70%, particularly preferred 5-50%.

The temperature of calcination has a significant impact onto the specific surface of the compound according to general formula (I). Low temperatures during calcination give normally rise to high specific surface area. High temperatures during calcination give usually rise to low specific surface area.

The spherical particles or agglomerates that are obtained from step (C) of the process according to the present invention have in general a specific BET surface area of 0.01 to 50 m$^2$/g, preferably 0.1 to 40 m$^2$/g. The present invention further relates to spherical particles or agglomerates comprising at least one compound of general formula (I) obtainable by the process according to the present invention. These spherical particles or agglomerates have characteristics as mentioned above.

The spherical particles or agglomerates that are obtained in step (C) of the process according to the present invention can optionally comprise further elements, for example carbon, that are optionally obtained by pyrolysis of the reducing agent, for example, a sugar.

The process according to the present invention can be conducted continuously or discontinuously. In a preferred embodiment the process according to the present invention is conducted continuously. Suitable apparatuses for step (C) are known to the person having ordinary skill in the art. One example for a discontinuous or continuous calcination is a rotary furnace. In case of continuous calcination the residence time in a rotary furnace is based on the inclination and the rotating speed of the furnace. A person having ordinary skill in the art does know how a suitable residence time is adjusted in the rotary furnace. In a preferred embodiment the solid that is calcinated in step (C) of the process according to the present invention is moved during calcination, for example in a fluidized bed reactor or in a rotary furnace. The solid can also be stirred during calcination. The rotary furnace can comprise different temperature zones. For example, in a first zone the temperature is adjusted to a low temperature in order to drain the spray dried powder, whereas in another zone a higher calcination temperature is present. The speed of heating of the powder is depending on the temperatures in the different zones and on the speed with which the powder is moved in the furnace.

Step (C) of the process according to the present invention is in general conducted under a pressure that is suitable that preferably complete conversion into the desired products is obtained. In a preferred embodiment step (C) is conducted under a pressure which is slightly higher than atmospheric pressure, in order to prevent oxygen penetrating the reactor from the outside. This slightly increased atmospheric pressure is preferably caused by at least one inert gas that is streaming over the solid compound that is calcinated in this step.

Depending on the composition of the electrode which can be prepared from the compound of general formula (I) and on the desired electrochemical properties of the resulting lithium-ion battery, it can be advantageous, according to the present application, if the solid compound obtained from step (B) is mechanically treated prior to step (C) and/or if the solid compound obtained from step (C) is mechanically treated after step (C), in order to destroy the spherical agglomerates into smaller and more dense agglomerates having the required size or into the primary particles. Suitable mills, compactors and/or rolls are known to a person having ordinary skill in the art. Examples are jet mills which supply very low abrasion, preferably under the use of nitrogen and/or air. For milling of the calcinated product also wet milling processes may be advantageous, for example by the use of a bead mill. Further suitable apparatuses are compactors and/or rollings.

The present invention further relates to a compound, preferably with a spherical morphology, according to general formula (I) as mentioned above, preparable by the process according to the present invention. These compounds having a spherical morphology have the characteristic features like diameter and porosity as mentioned above. These spherical particles preferably consist of crystalline primary particles, which preferably show essentially the crystal structure of $LiFePO_4$. These primary particles with a composition according to general formula (I) preparable by the process according to the present invention show improved crystallinity compared to compounds prepared by processes according to the prior art. In addition the size distribution of the primary particles obtained is narrower compared to the prior art. The crystallinity of the primary particles obtained is improved and the solids obtained have an improved dispersion of ingredients. Moreover, the invention enables a significant decrease of the usually applied high calcination temperature of 800° C. and more to prepare a single phase lithium-iron-phosphate. A decrease of the calcination temperature leads in general to a more finely divided material with a very narrow size distribution of the crystallites, supplying improved Li-ion diffusivity in the charging and discharging of a Li-ion battery. By improving the Li-ion diffusivity the power characteristics and additionally the capacity of a Li-ion battery can be increased.

Because of this fact the materials according to the present invention of general formula (I) preparable by the process according to the present invention are particularly suitable for the use for the preparation of a cathode of a lithium-ion battery or an electrochemical cell. Therefore the present invention also relates to the use of a spherical particle or agglomerate or of compound of general formula (I) obtainable/preparable by the process according to the present invention for the preparation of a cathode of a lithium-ion battery or an electrochemical cell.

The present invention further relates to a cathode for a lithium-ion battery, comprising at least one spherical particle or agglomerate compound according to general formula (I) obtainable/preparable by the process according to the present invention. To obtain a cathode as mentioned above the compound according to general formula (I) is mixed with at least one electrically conducting material, described for example in WO 2004/082047.

Suitable electrically conducting materials are for example carbon black, graphite, carbon fibres, carbon nanofibres, carbon nanotubes or electrically conducting polymers. Typically 2.0 to 40% by weight of the at least one electrically conducting material are used together with the compound according to general formula (I) in the cathode. To obtain the cathode the electrically conducting material and the compound according to general formula (I) are mixed, optionally in the presence of an organic solvent and optionally in the presence of an organic binder, for example polyisobutene, and this mixture is optionally formed and dried. A temperature of 80 to 150° C. is applied in the drying step.

In a preferred embodiment at least a part of the at least one electrically conducting material or at least one precursor of an electrically conducting material is added during the preparation of compounds according to general formula (I) as mentioned above. In a preferred embodiment, at least a part of the at least one electrically conducting material or at least one precursor of an electrically conducting material is added to the mixture of the starting materials in the preparation of the compound according to general formula (I). The remaining part of the least one electrically conducting material or at least one precursor of an electrically conducting material, which has not been added during the preparation of compounds according to general formula (I), is added after this preparation.

Therefore, the present invention also relates to a process for the preparation of a mixture comprising at least one compound according to general formula (I) as defined above and at least one electrically conducting material comprising the following steps (D) providing a mixture comprising at least one electrically conducting material or at least one precursor of an electrically conducting material, at least one lithium-comprising compound, at least one iron-comprising compound, in which iron has the oxidation state +3, and at least one $M^1$-comprising compound, if present, and/or at least one $M^2$-comprising compound, if present, and/or at least one $M^3$-comprising compound, if present, and at least one reducing agent which is oxidized to at least one compound comprising at least one phosphorous atom in oxidation state +5, (E) optionally drying the mixture provided in step (D), in order to obtain a solid compound and (F) calcining the solid compound obtained from step (E) at a temperature of 300 to 1000° C.

In a preferred embodiment of this process according to the present invention, the mixture that is provided in step (D) is essentially aqueous. In a further preferred embodiment the mixture which is provided in step (D) additionally comprises at least one compound comprising at least one phosphorous atom in oxidation state +5.

The lithium-, $M^1$, $M^2$ and/or $M^3$-comprising compounds, the iron-comprising compounds, the at least one reducing agent which is oxidized to at least one compound comprising at least one phosphorous atom in oxidation state +5, the optionally present at least one compound comprising at least one phosphorous atom in oxidation state +5, the electrically conductive materials, the apparatuses and the process parameters of the steps (D) to (F) correspond to the ones described above. In addition to the at least one reducing agent which is oxidized to at least one compound comprising at least one phosphorous atom in oxidation state +5, the optionally present at least one compound comprising at least one phosphorous atom in oxidation state +5, at least one additional reducing agent can be added in a preferred embodiment, as mentioned and defined above.

In a preferred embodiment the electrically conducting material is chosen from the group consisting of carbon black, graphite, carbon fibres, carbon nanofibres, carbon nanotubes, electrically conducting polymers or mixtures thereof. The at least one precursor of an electrically conducting material is preferably chosen from compounds that can be reacted into carbon by pyrolysis during the preparation of the mixture according to the present invention, for example polyethylene, polypropylene, glucose, fructose, succhrose, saccharose, xylose, sorbose, lactose, starch, cellulose and its esters, block polymers of ethylene and ethylene oxide and polymers of furfuryl alcohol, or mixtures thereof. Especially preferred are water-soluble carbon-precursors.

If carbon black, graphite or substances essentially consisting of carbon are used as electrically conducting materials in step (D), these materials are preferably suspended in a mixture, preferably an essentially aqueous solution or dispersion, of the other components. This can be achieved by direct addition of these electrically conducting materials to the, preferably aqueous, mixture of the other components. Alternatively, carbon black, graphite or substances essentially consisting of carbon can be suspended in an aqueous solution of hydrogen peroxide, and this suspension can then be added to a solution or dispersion of one or more components as mentioned above. Treatment with hydrogen peroxide normally improves the wettability of carbon with water and makes it possible to obtain carbon containing suspensions having an improved stability, i.e. having a lower tendency for demixing. In addition the homogenous dispersion of the electrically conducting material in the mixture is improved. By further stirring and/or heating of the aqueous suspension the excess hydrogen peroxide is decomposed into water and oxygen in the catalytic presence of the Li—, Fe—and/or P-containing precursors.

Alternatively, instead of hydrogen peroxide or in addition to hydrogen peroxide, surfactants can be used in order to dispers the substances essentially consisting of carbon. Suitable surfactants are known to a person having ordinary skill in the art, like block copolymers of ethylene oxide and/or propylene oxide, for example surfactants which are commercially available under the trade name Pluronics® of BASF SE.

If at least one precursor of an electrically conducting material is used, this at least one precursor can be used without the addition of at least one electrically conductive material or, optionally, in mixture with at least one electrically conductive material.

The present invention also relates to a mixture, comprising at least one compound according to general formula (I) as defined above and at least one electrically conducting material, preparable by a process as mentioned above. In contrast to materials according to the prior art, these mixtures according to the present invention show an improved dispersion of the at least one electrically conducting material within the spherical agglomerates of the resulting material. This improved C-dispersion leads to a highly electrically conductive perculation network of carbon within the cathode material powder according to the present invention and in addition to an improved electrical conductivity of the layer like electrode. The mixture comprising at least one compound according to general formula (I) and at least one electrically conducting material in general has BET surface area which is determined by the kind and the amount of the additional carbon within the mixture and may vary from 0.1 to 500 m$^2$/g.

The present invention further relates to spherical particles or agglomerates comprising the mixture, comprising at least one compound according to general formula (I) as defined above and at least one electrically conducting material, preparable by a process as mentioned above. The characteristics concerning size, porosity etc. are in accordance with the spherical particles or agglomerates comprising no electrically conducting material as defined above.

Therefore, the present invention also relates to the use of a mixture as mentioned above or of spherical particles or agglomerates comprising the mixture, comprising at least one compound according to general formula (I) as defined above and at least one electrically conducting material for the preparation of a cathode of a lithium-ion battery or an electrochemical cell.

The present invention also relates to a cathode for a lithium-ion battery, comprising a mixture or spherical particles or agglomerates comprising the mixture as mentioned above.

For the preparation of a cathode using the compound according to general formula (I) as mentioned above or a mixture comprising the compound according to general formula (I) or spherical particles or agglomerates as mentioned above and at least one electrically conducting material as mentioned above, in a preferred embodiment the following binders are used:

Polyethyleneoxide (PEO), cellulose, polyethylene, polypropylene, polytetrafluoroethylene, polyacrylonitrile-methylmethacrylate, styrene-butadiene-copolymers, tetrafluoroethylene-hexyluoropropylene-copolymers, polyvinylidenefluoride-hexafluoropropylene-copolymers (PVdF-HFP), perfluoroalkyl-vinylether-copolymers, vinylidenefluoride-chlorotrifluoroethylene-copolymers, ethylene-chlorofluoroethylene-copolymers, ethylene-acrylic acid-copolymers (with and without sodium ions included), ethylene-methacrylic acid (with and without sodium ions included), polyimides and polyisobutene.

The binder is normally added in an amount of 1 to 10% by weight, preferably 2 to 8% by weight, particularly preferred 3 to 7% by weight, in each case based on the whole cathode material.

FIGURES

FIG. 1 shows SEM pictures of powders obtained after calcination at 700° C., consisting of agglomerates of primary particles of LiFePO$_4$ having the crystalline structure of orthorhombic triphylite.

FIG. 2 shows SEM pictures of powders obtained after calcination at 750° C., consisting of agglomerates of primary particles of LiFePO$_4$ having the crystalline structure of orthorhombic triphylite.

FIG. 3 shows SEM pictures of powders obtained after calcination at 400° C., consisting of agglomerates of primary particles of LiFePO$_4$ having the crystalline structure of orthorhombic triphylite.

FIG. 4 shows SEM pictures of powders obtained after calcination at 600° C., consisting of agglomerates primary particles of LiFePO$_4$ having the crystalline structure of or thorhombic triphylite.

FIG. 5 shows SEM pictures of powders obtained after calcination at 750° C., consisting of agglomerates of primary particles of LiFePO$_4$ having the crystalline structure of orthorhombic triphylite and additionally incorporated carbon black.

EXAMPLES

Figure 1:
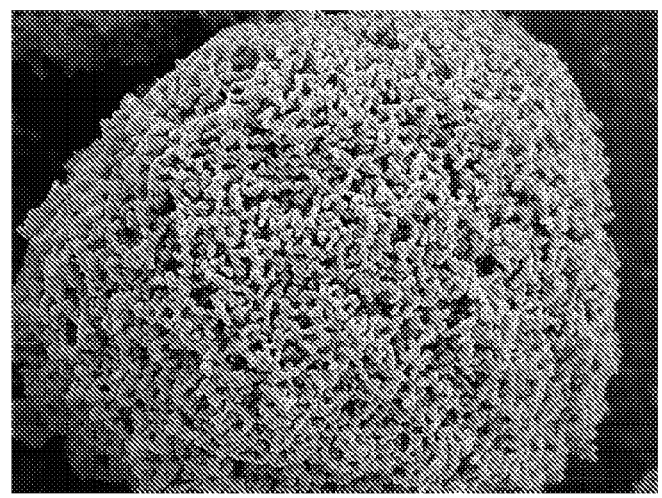
FIGS. 1 to 5 show scanning electron microscope (SEM) pictures of the compounds and mixtures obtained in the following examples.
Figure 1:
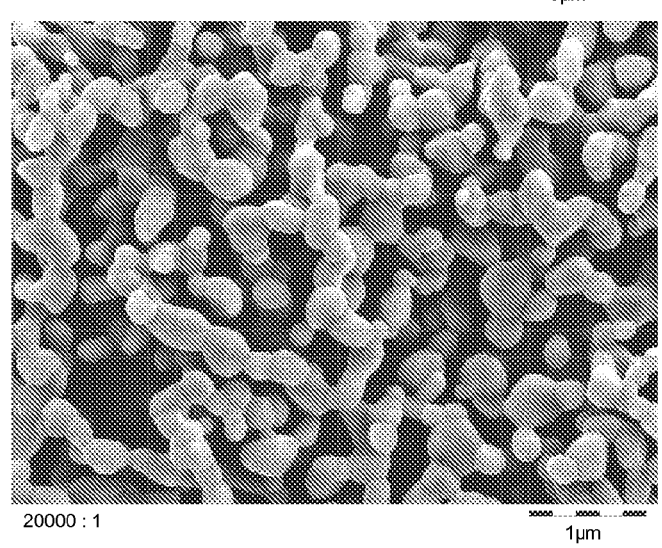
Figure 1:
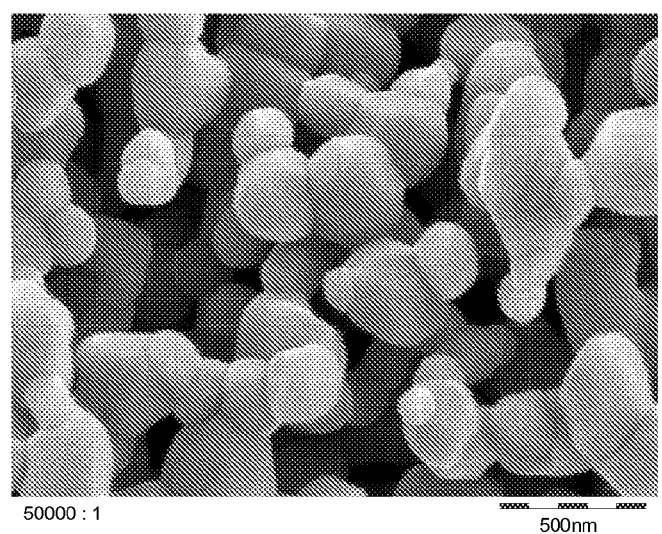

The present invention is further illustrated by the following examples:

Example 1

LiFePO$_4$ from LiOH.H$_2$O, α-FeOOH, H$_3$PO$_3$ and H$_3$PO$_4$ (stoichiometric, 60 h stirring)

$$2LiOH.H_2O + 2Fe^{3+}OOH + H_3PO_3 + H_3PO_4 = 2LiFe^{2+}P^{5+}O_4 + 5H_2O$$

In a 10 L-glass-reactor which is heatable from the outside, 6 L water are placed at 80° C. under streaming N$_2$ (50 NL/h). The streaming N$_2$-cover is maintained during the further process. Under stirring 174.97 g LiOH.H$_2$O (57.49% LiOH, 4.2 mol Li, Chemetall GmbH, D-60487 Frankfurt, Germany) are added and dissolved to give a clear, colourless solution. 366.20 g α-FeOOH (61.0% Fe, BET=14 m$^2$/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. 167.34 g H$_3$PO$_3$ (98%, 2 mol P, Acros Organics, B-2440 Geel, Belgium) are added to the amber aqueous suspension during 0.5 minutes. Subsequently, 230.58 g H$_3$PO$_4$ (85%, 2 Mol P, Riedel-de-Haen, D-30926 Seelze) are added. The aqueous suspension obtained is stirred for 60 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz glass bubble under streaming nitrogen (15 NL/h) in a laboratory rotary furnace (BASF) and heated in one hour to an end temperature T, is hold at this temperature T for one hour and is subsequently cooled to room temperature under streaming N$_2$.

Example 1.1

The end temperature T of 350° C. gives rise to a powder having a BET-surface of 20.0 m$^2$/g and a X-ray powder diffraction pattern, showing essentially the crystal structure of orthorhombic LiFePO$_4$ (triphylite) [powder defraction pattern 00-040-1499 of the International Center for Defraction Data (ICDD)] and a very low amount of α-Fe$_2$O$_3$. Chemical analysis shows the composition Li$_{1.03}$Fe(PO$_4$)$_{0.99}$. Analysis of the oxidation state of iron (Fe$_{ox}$) contained in LiFePO$_4$ is conducted according to the following formula:

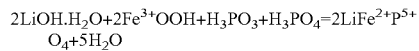

$$Fe_{ox} = 3 - \{[Fe^{2+}]/([Fe^{2+}]+[Fe^{3+}])\}$$

For the determination of the Fe$_{ox}$-value powder samples are dissolved in aqueous HCl at 80° C. under nitrogen. Determination of the amount of Fe$^{2+}$[Fe$^{2+}$] in this solution is conducted by potentiometric titration with 0.1 n K$_2$Cr$_2$O$_7$-solution. The concentration of Fe$^{3+}$[Fe$^{3+}$] of a further HCl-acidic sample is acquired by potentiometric titration with 0.1 n TiCl$_3$-solution. According to these values for the amount of Fe$^{2+}$ and Fe$^{3+}$ the oxidation state Fe$_{ox}$ of 2.10 for the calcination at 350° C. is obtained. Scanning electron microscopy shows that the powder has a spherical habitus having a medium spherical size of about 30 μm. The single sphericals consist of primary particles of LiFePO$_4$, wherein cavities can be identified between the primary particles.

Example 1.2

The end temperature T of 400° C. gives rise to a powder having a BET-surface of 17.7 m$^2$/g and an X-ray powder diffraction pattern, showing essentially the crystal structure of or orthorhombic LiFePO$_4$ (triphylite) and a very low amount of α-Fe$_2$O$_3$. The oxidation state of Fe is acquired according to Example 1.1 and is Fe$_{ox}$=2.09. Scanning electron microscopy shows that the powder has a spherical habitus having a medium spherical size of about 30 μm. The single sphericals consist of primary particles of LiFePO$_4$, wherein cavities can be identified between the primary particles.

Example 1.3

The end temperature T of 500° C. gives rise to a powder having a BET-surface of 13.8 m$^2$/g and an X-ray powder diffraction pattern, showing essentially the crystal structure of orthorhombic LiFePO$_4$ (triphylite) and a very low amount of α-Fe$_2$O$_3$. The oxidation state of Fe is acquired according to Example 1.1 and is Fe$_{ox}$=2.06. Scanning electron microscopy shows that the powder has a spherical habitus having a medium spherical size of about 30 μm. The single sphericals consist of primary particles of LiFePO$_4$, wherein cavities can be identified between the primary particles. The diameter of the primary particles is about 100-200 nm.

Example 1.4

The end temperature T of 600° C. gives rise to a powder having a BET-surface of 9.8 m$^2$/g and an X-ray powder diffraction pattern, showing the single phase with a crystal structure of orthorhombic LiFePO$_4$ (triphylite). The oxidation state of Fe is acquired according to Example 1.1 and is Fe$_{ox}$=2.03. Scanning electron microscopy shows that the powder has a spherical habitus having a medium spherical size of about 30 μm. The single sphericals consist of primary particles of LiFePO$_4$, wherein cavities can be identified between the primary particles. The diameter of the primary particles is about 150-250 nm.

Example 1.5

The end temperature T of 700° C. gives rise to a powder having a BET-surface of 5.0 m$^2$/g and an X-ray powder diffraction pattern, showing a single phase with a crystal structure of orthorhombic LiFePO$_4$ (triphylite). The oxidation state of Fe is acquired according to Example 1.1 and is Fe$_{ox}$=2.03. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 150-200 nm (FIG. 1).

Example 1.6

The end temperature T of 750° C. gives rise to a powder having a BET-surface of 3.7 m$^2$/g and an X-ray powder diffraction pattern, showing a single phase with the crystal structure of orthorhombic LiFePO$_4$ (triphylite). The oxidation state of Fe is acquired according to Example 1.1 and is Fe$_{ox}$=2.02. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 200-500 nm.

Example 2

LiFePO$_4$ from LiOH.H$_2$O, α-FeOOH, H$_3$PO$_3$ and H$_3$PO$_4$ (stoichiometric, 16 h stirring)

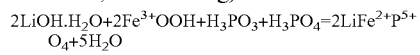

In a 10 L-glass-reactor which is heatable from the outside, 6 L water are placed at 80° C. under streaming N$_2$ (50 NL/h). The streaming N$_2$-cover is maintained during the further process. Under stirring 174.97 g LiOH.H$_2$O (57.49% LiOH, 4.2 mol Li, Chemetall GmbH, D-60487 Frankfurt, Germany) are added and dissolved to give a clear, colourless solution. 366.20 g α-FeOOH (61.0% Fe, BET=14 m$^2$/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. 167.34 g H$_3$PO$_3$ (98%, 2 mol P, Acros Organics, B-2440 Geel, Belgium) are added to the amber aqueous suspension during 0.5 minutes. Subsequently, 230.58 g H$_3$PO$_4$ (85%, 2 Mol P, Riedel-de-Haen, D-30926 Seelze) are added. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz glass bubble under streaming nitrogen (15 NL/h) in a laboratory rotary furnace (BASF) and heated in one hour to an end temperature T, is hold at this temperature T for one hour and is subsequently cooled to room temperature under streaming N$_2$.

Example 2.1

The end temperature T of 350° C. gives rise to a powder having a BET-surface of 9.1 m$^2$/g The X-ray powder diffraction pattern shows essentially the crystal structure of orthorhombic LiFePO$_4$ (triphylite) and a very low amount of α-Fe$_2$O$_3$. The oxidation state is acquired according to example 1.1 and is Fe$_{ox}$=2.09. Scanning electron microscopy shows that the powder has a spherical habitus having a medium spherical size of about 30 μm. The single sphericals consist of primary particles of LiFePO$_4$, wherein cavities are between the primary particles.

Example 2.2

The end temperature T of 400° C. gives rise to a powder having a BET-surface of 8.4 m$^2$/g. The X-ray powder diffraction pattern shows essentially the crystal structure of orthorhombic LiFePO$_4$ (triphylite) and a very low amount of α-Fe$_2$O$_3$. The oxidation state of Fe is acquired according to Example 1.1 and is Fe$_{ox}$=2.08. Scanning electron microscopy shows that the powder has a spherical habitus having a medium spherical size of about 30 μm. The single sphericals consist of primary particles of LiFePO$_4$, wherein cavities are between the primary particles.

Example 2.3

The end temperature T of 500° C. gives rise to a powder having a BET-surface of 5.0 m$^2$/g. The X-ray powder diffraction pattern shows essentially the crystal structure of orthorhombic LiFePO$_4$ (triphylite) and a very low amount of α-Fe$_2$O$_3$. The oxidation state of Fe is acquired according to Example 1.1 and is Fe$_{ox}$=2.05. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 100-150 nm.

Example 2.4

The end temperature T of 600° C. gives rise to a powder having a BET-surface of 3.4 m$^2$/g and a X-ray powder diffraction pattern, showing a single phase with the crystal structure of orthorhombic LiFePO$_4$ (triphylite). The oxidation state of Fe is acquired according to Example 1.1 and is Fe$_{ox}$=2.02. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 150-250 nm.

Example 2.5

The end temperature T of 700° C. gives rise to a powder having a BET-surface of 3.1 m$^2$/g and a X-ray powder diffraction pattern, showing a single phase with the crystal structure of or orthorhombic LiFePO$_4$ (triphylite). The oxidation state of Fe is acquired according to Example 1.1 and is Fe$_{ox}$=2.02. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 150-250 nm.

Example 2.6

The end temperature T of 750° C. gives rise to a powder having a BET-surface of 2.6 m$^2$/g and a X-ray powder diffraction pattern, showing a single phase with the crystal structure of orthorhombic LiFePO$_4$ (triphylite). The oxidation state of Fe is acquired according to Example 1.1 and is Fe$_{ox}$=2.02. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 200-600 nm.

Example 3

LiFePO$_4$ from LiOH.H$_2$O, α-FeOOH, H$_3$PO$_3$ and H$_3$PO$_4$ (H$_3$PO$_3$ in excess, 16 h stirring)

2LiOH.H$_2$O+2Fe$^{3+}$OOH+1.06H$_3$PO$_3$+0.94H$_3$PO$_4$-->2LiFe$^{2+}$P$^{5+}$O$_4$

In a 10 L-glass-reactor which is heatable from the outside, 6 L water are placed at 80° C. under streaming N$_2$ (50 NL/h). The streaming N$_2$-cover is maintained during the further process. Under stirring 174.97 g LiOH.H$_2$O (57.49% LiOH, 4.2 mol Li, Chemetall GmbH, D-60487 Frankfurt, Germany) are added and dissolved to give a clear, colourless solution. 366.20 g α-FeOOH (61.0% Fe, BET=14 m$^2$/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. 177.38 g H$_3$PO$_3$ (98%, 2.12 mol P, Acros Organics, B-2440 Geel, Belgium) are added to the amber aqueous suspension during 0.5 minutes. Subsequently, 216.75 g H$_3$PO$_4$ (85%, 1.88 Mol P, Riedel-de-Haen, D-30926 Seelze) are added. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz glass bubble under streaming nitrogen (15 NL/h) in a laboratory rotary furnace (BASF) and heated in one hour to an end temperature T, is hold at this temperature T for one hour and is subsequently cooled to room temperature under streaming N$_2$.

Example 3.1

The end temperature T of 400° C. gives rise to a powder having a BET-surface of 7.6 m$^2$/g. The X-ray powder diffraction pattern shows essentially the crystal structure of orthorhombic LiFePO$_4$ (triphylite) and a very low amount of α-Fe$_2$O$_3$. The oxidation state is acquired according to example 1.1 and is Fe$_{ox}$=2.06. Scanning electron microscopy shows that the powder has a spherical habitus having a medium spherical size of about 30 μm. The single sphericals consist of primary particles of LiFePO$_4$, wherein cavities are between the primary particles.

Example 3.2

The end temperature T of 500° C. gives rise to a powder having a BET-surface of 5.4 m$^2$/g. The X-ray powder diffraction pattern shows essentially the crystal structure of orthorhombic LiFePO$_4$ (triphylite) and a very low amount of α-Fe$_2$O$_3$. The oxidation state of Fe is acquired according to Example 1.1 and is Fe$_{ox}$=2.03. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 100-150 nm.

Example 3.3

The end temperature T of 600° C. gives rise to a powder having a BET-surface of 3.4 m$^2$/g. The X-ray powder diffraction pattern shows a single phase with the crystal structure of orthorhombic LiFePO$_4$ (triphylite). The oxidation state of Fe is acquired according to Example 1.1 and is Fe$_{ox}$=2.01. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 100-200 nm.

Example 3.4

The end temperature T of 700° C. gives rise to a powder having a BET-surface of 2.7 m$^2$/g and an X-ray powder diffraction pattern, showing a single phase with the crystal structure of orthorhombic LiFePO$_4$ (triphylite). The oxidation state of Fe is acquired according to Example 1.1 and is Fe$_{ox}$=2.01. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 150-300 nm.

Example 3.5

Figure 2:
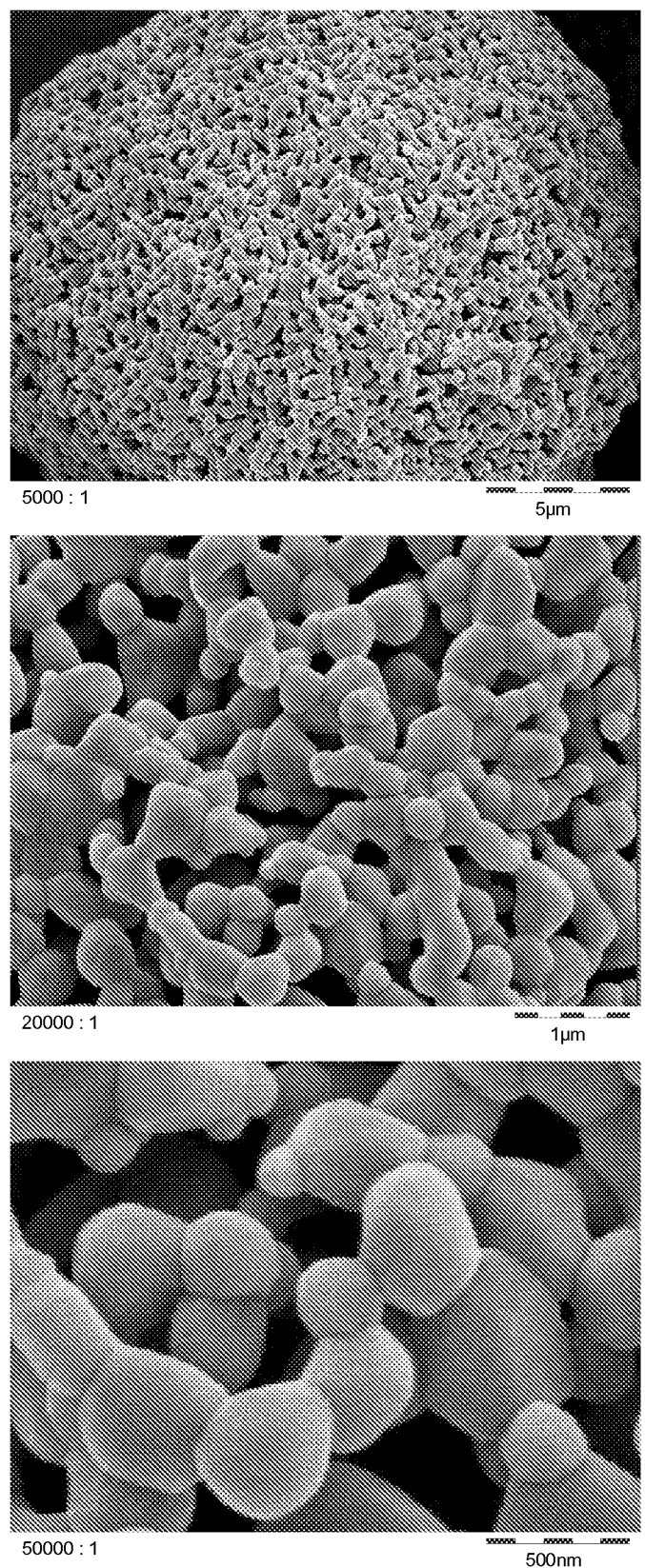

The end temperature T of 750° C. gives rise to a powder having a BET-surface of 1.9 m$^2$/g and an X-ray powder diffraction pattern, showing the monophasic crystal structure of orthorhombic LiFePO$_4$ (triphylite). The oxidation state of Fe is acquired according to Example 1.1 and is Fe$_{ox}$=2.01. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 200-600 nm (FIG. 2).

Example 4

LiFePO$_4$ from LiOH.H$_2$O, α-FeOOH, H$_3$PO$_3$ and H$_3$PO$_4$ (stoichiometric, 16 h stirring, in situ-pyrolysis of additional succhrose leads to about 1 weight-% of carbon)

2LiOH.H$_2$O+2Fe$^{3+}$OOH+H$_3$PO$_3$+H$_3$PO$_4$=2LiFe$^{2+}$P$^{5+}$O$_4$+5H$_2$O

In a 10 L-glass-reactor which is heatable from the outside, 6 L water are placed at 80° C. under streaming N$_2$ (50 NL/h). The streaming N$_2$-cover is maintained during the further process. Under stirring 174.97 g LiOH.H$_2$O (57.49% LiOH, 4.2 mol Li, Chemetall GmbH, D-60487 Frankfurt, Germany) are added and dissolved to give a clear, colourless solution. 366.20 g α-FeOOH (61.0% Fe, BET=14 m$^2$/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. 167.34 g H$_3$PO$_3$ (98%, 2 mol P, Acros Organics, B-2440 Geel, Belgium) are added to the amber aqueous suspension during 0.5 minutes. Subsequently, 230.58 g H$_3$PO$_4$ (85%, 2 Mol P, Riedel-de-Haen, D-30926 Seelze) and 79.24 g saccharose (succhrose, C$_{12}$O$_{11}$H$_{22}$, 0.23 mol, Riedel-de-Haen, D-30926 Seelze, Germany) are added and dissolved under further stirring. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz glass bubble under streaming nitrogen (15 NL/h) in a laboratory rotary furnace (BASF) and heated in one hour to an end temperature T, is hold at this temperature T for one hour and is subsequently cooled to room temperature under streaming $N_2$.

Example 4.1

The end temperature T of 350° C. gives rise to a powder having a BET-surface of 18.3 $m^2$/g The X-ray powder diffraction pattern shows essentially the crystal structure of orthorhombic $LiFePO_4$ (triphylite) and a very low amount of $\alpha$-$Fe_2O_3$. The oxidation state is acquired according to example 1.1 and is $Fe_{ox}$=2.10. Chemical composition of the lithium-iron-phosphate obtained shows $Li_{1.05}Fe(PO_4)_{0.99}$. The amount of carbon is 1.7% by weight. Scanning electron microscopy shows that the powder has a spherical habitus having a medium spherical size of about 30 μm. The single sphericals consist of primary particles of $LiFePO_4$, wherein cavities are between the primary particles.

Example 4.2

The end temperature T of 400° C. gives rise to a powder having a BET-surface of 17.1 $m^2$/g The X-ray powder diffraction pattern shows essentially the crystal structure of orthorhombic $LiFePO_4$ (triphylite) and a very low amount of $\alpha$-$Fe_2O_3$. The oxidation state is acquired according to example 1.1. and is $Fe_{ox}$=2.06. Chemical composition of the lithium-iron-phosphate obtained shows $Li_{1.06}Fe(PO_4)_{0.99}$. The amount of carbon is 1.5% by weight. Scanning electron microscopy shows that the powder has a spherical habitus having a medium spherical size of about 30 μm. The single sphericals consist of primary particles of $LiFePO_4$, wherein cavities are between the primary particles.

Example 4.3

The end temperature T of 500° C. gives rise to a powder having a BET-surface of 14.8 $m^2$/g. The X-ray powder diffraction pattern shows a single phase with the crystal structure of orthorhombic $LiFePO_4$ (triphylite). The oxidation state of Fe is acquired according to Example 1.1 and is $Fe_{ox}$=2.03. Chemical composition of the lithium-iron-phosphate obtained shows $Li_{1.05}Fe(PO_4)_{0.99}$. The amount of carbon is 1.5% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 150-200 nm.

Example 4.4

The end temperature T of 600° C. gives rise to a powder having a BET-surface of 14.1 $m^2$/g and an X-ray powder diffraction pattern, showing a single phase with the crystal structure of orthorhombic $LiFePO_4$ (triphylite). The oxidation state of Fe is acquired according to Example 1.1 and is $Fe_{ox}$=2.02. Chemical composition of the lithium-iron-phosphate obtained shows $Li_{1.06}Fe(PO_4)_{0.99}$. The amount of carbon is 1.4% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 200-300 nm.

Example 4.5

The end temperature T of 700° C. gives rise to a powder having a BET-surface of 12.0 $m^2$/g and an X-ray powder diffraction pattern, showing a single phase with the crystal structure of orthorhombic $LiFePO_4$ (triphylite). The oxidation state of Fe is acquired according to Example 1.1 and is $Fe_{ox}$=2.01. Chemical composition of the lithium iron phosphate obtained shows $Li_{1.07}Fe(PO_4)_{1.00}$. The amount of carbon is 1.3% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 200-350 nm.

Example 4.6

The end temperature T of 750° C. gives rise to a powder having a BET-surface of 9.2 $m^2$/g and an X-ray powder diffraction pattern, showing a single phase with the crystal structure of orthorhombic $LiFePO_4$ (triphylite). The oxidation state of Fe is acquired according to Example 1.1 and is $Fe_{ox}$=2.01. Chemical composition of the lithium-iron-phosphate obtained shows $Li_{1.07}Fe(PO_4)_{0.99}$. The amount of carbon is 1.0% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 200-350 nm.

Example 5

$LiFePO_4$ from $LiOH.H_2O$, $\alpha$-FeOOH, $H_3PO_3$ and $H_3PO_4$ (stoichiometric, 16 h stirring, in situ-pyrolysis of additional succhrose leads to about 2.5 weight-% of carbon)

$$2LiOH.H_2O+2Fe^{3+}OOH+H_3PO_3+H_3PO_4=2LiFe^{2+}P^{5+}O_4+5H_2O$$

In a 10 L-glass-reactor which is heatable from the outside, 6 L water are placed at 80° C. under streaming $N_2$ (50 NL/h). The streaming $N_2$-cover is maintained during the further process. Under stirring 174.97 g $LiOH.H_2O$ (57.49% LiOH, 4.2 mol Li, Chemetall GmbH, D-60487 Frankfurt, Germany) are added and dissolved to give a clear, colourless solution. 366.20 g $\alpha$-FeOOH (61.0% Fe, BET=14 $m^2$/g, 4.0 mol Fe; ZMAG-5102, CATHAY PIGMENTS (USA) Inc., 4901 Evans Ave., Valparaiso, Ind. 46383, USA) are added. This $\alpha$-FeOOH of the type ZMAG-5102 which is added shows a needle-shaped habitus having an average needle-length of 1 μm and an average needle-diameter of 100-200 nm in the transmission electron microscopy. 167.34 g $H_3PO_3$ (98%, 2 mol P, Acros Organics, B-2440 Geel, Belgium) are added to the amber aqueous suspension during 0.5 minutes. Subsequently, 230.58 g $H_3PO_4$ (85%, 2 Mol P, Riedel-de-Haen, D-30926 Seelze) and 163.66 g saccharose (succhrose, $C_{12}O_{11}H_{22}$, 0.48 mol, Riedel-de-Haen, D-30926 Seelze, Germany) are added and dissolved under further stirring. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz glass bubble under streaming nitrogen (15 NL/h) in a laboratory rotary furnace (BASF) and heated in one hour to an end temperature T, is hold at this temperature T for one hour and is subsequently cooled to room temperature under streaming $N_2$.

Example 5.1

Figure 3:
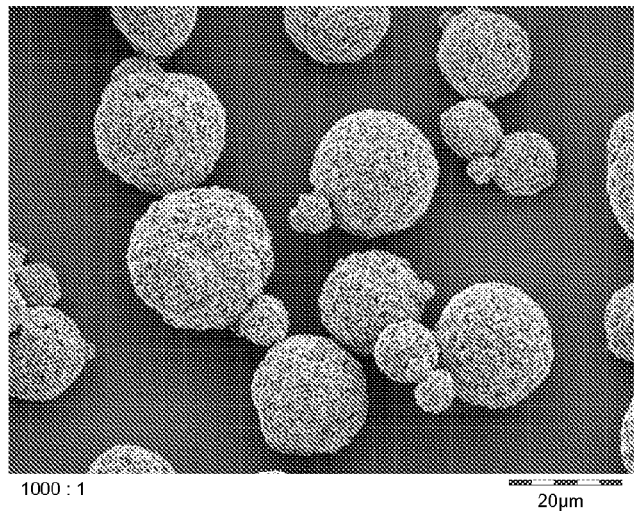
Figure 3:
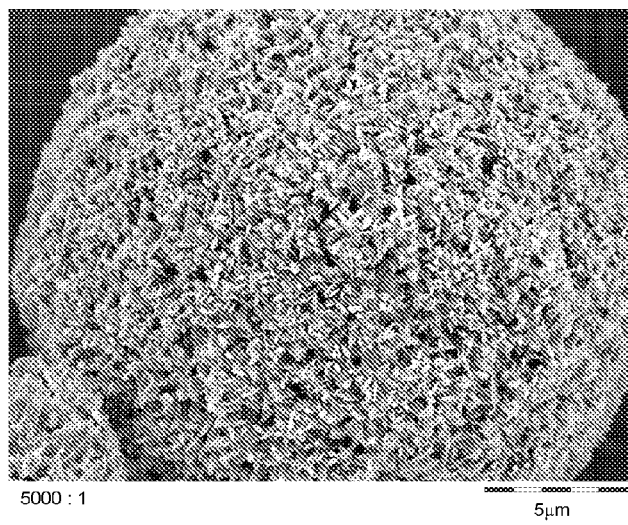
Figure 3:
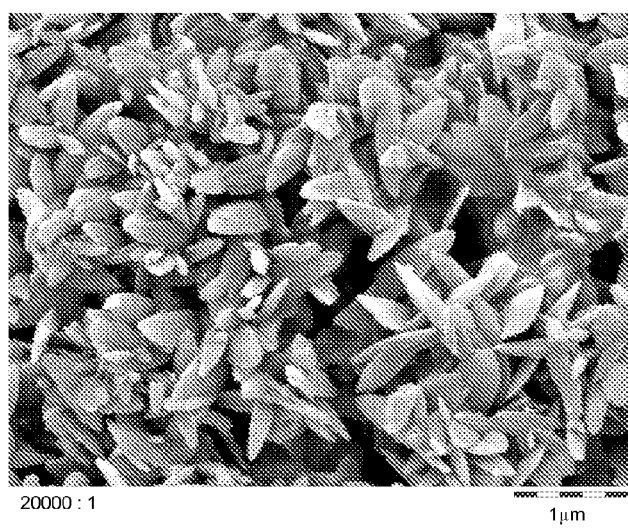

The end temperature T of 400° C. gives rise to a powder having a BET-surface of 19.3 m²/g. The X-ray powder diffraction pattern shows the monophasic crystal structure of orthorhombic $LiFePO_4$ (triphylite). The oxidation state is acquired according to example 1.1 and is $Fe_{ox}$=2.06. Chemical composition of the lithium-iron-phosphate obtained shows $Li_{1.04}Fe(PO_4)_{0.99}$. The amount of carbon is 3.3% by weight. Scanning electron microscopy shows that the powder has a spherical habitus having a medium spherical size of about 30 μm. The single sphericals consist of primary particles of $LiFePO_4$, wherein cavities are between the primary particles (FIG. 3).

Example 5.2

Figure 4:
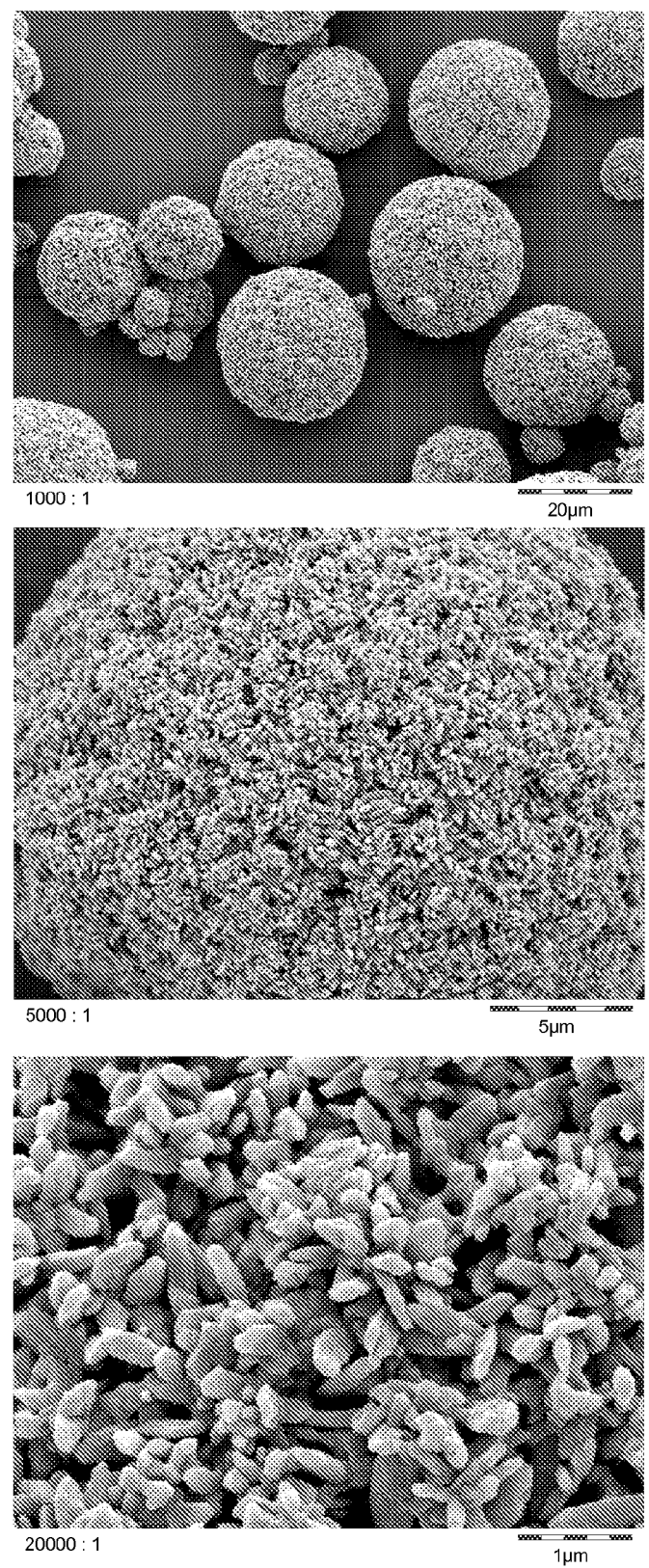

The end temperature T of 600° C. gives rise to a powder having a BET-surface of 22.0 m²/g. The X-ray powder diffraction pattern shows a single phase with the crystal structure of orthorhombic $LiFePO_4$ (triphylite). The oxidation state is aquired according to example 1.1 and is $Fe_{ox}$=2.03. Chemical composition of the lithium-iron-phosphate obtained shows $Li_{1.05}Fe(PO_4)_{0.99}$. The amount of carbon is 3.1% by weight. Scanning electron microscopy shows that the powder has a spherical habitus having a medium spherical size of about 30 μm. The single sphericals consist of primary particles of $LiFePO_4$, wherein cavities are between the primary particles (FIG. 4).

Example 5.3

The end temperature T of 750° C. gives rise to a powder having a BET-surface of 20.6 m²/g. The X-ray powder diffraction pattern shows a single phase with the crystal structure of orthorhombic $LiFePO_4$ (triphylite). The oxidation state of Fe is acquired according to Example 1.1 and is $Fe_{ox}$=2.01. Chemical composition of the lithium-iron-phosphate obtained shows $Li_{1.04}Fe(PO_4)_{0.99}$. The amount of carbon is 2.5% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 150-200 nm.

Example 6

$LiFePO_4$ from $LiOH.H_2O$, $\alpha$-FeOOH, $H_3PO_3$ and $H_3PO_4$ (stoichiometric, 2 h stirring, additional carbon black leads to about 3 weight-% of carbon)

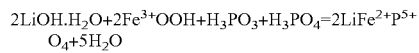

In a 5 L-glass-reactor 3 l of water are placed at room temperature under stirring. 20.18 g carbon black (Timcal Super P Li, Timcal Deutschland GmbH, D-40212 Dusseldorf, Germany) are added to the water, wherein the carbon black swims on the surface. Subsequently, 150 ml aqueous $H_2O_2$-solution (30%, Merck GmbH, D-64293 Darmstadt, Germany) are added drop wise under stirring, wherein the carbon black disperses in water. The black, aqueous carbon black dispersion obtained is added under stirring to 2850 ml water having room temperature, being in a 10 L-glass-reactor which is heatable from the outside. The mixture obtained is heated to 60° C. under streaming $N_2$ (50 NL/h) and is hold at this temperature for two hours. Under stirring 174.97 g $LiOH.H_2O$ (57.49% LiOH, 4.2 mol Li, Chemetall GmbH, D-60487 Frankfurt, Germany) are added to this mixture being tempered to 60° C. To the resulting mixture 366.20 g α-FeOOH (61.0% Fe, BET=14 m²/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. The resulting suspension is heated to 90° C. Subsequently, 167.34 g $H_3PO_3$ (98%, 2 mol P, Acros Organics, B-2440 Geel, Belgium) are added during 0.5 minutes. After 20 minutes of further stirring, 230.58 g $H_3PO_4$ (85%, 2 Mol P, Riedel-de-Haen, D-30926 Seelze) are added. The suspension obtained is further stirred for two hours while $N_2$-streaming is maintained. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz glass bubble under streaming nitrogen (15 NL/h) in a laboratory rotary furnace (BASF) and heated in one hour to an end temperature T, is hold at this temperature T for one hour and is subsequently cooled to room temperature under streaming $N_2$.

Example 6.1

The end temperature T of 750° C. gives rise to a powder having a BET-surface of 3.8 m²/g. The X-ray powder diffraction pattern shows the monophasic crystal structure of orthorhombic $LiFePO_4$ (triphylite). The oxidation state is acquired according to example 1.1 and is $Fe_{ox}$=2.01. Chemical composition of the lithium-iron-phosphate obtained shows $Li_{1.04}Fe(PO_4)_{0.99}$. The amount of carbon is 3.0% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 200-600 nm. The very fine carbon black that has been introduced is present in a part of cavities between the primary particles within the spherical agglomerats.

Example 7

$LiFePO_4$ from $LiOH.H_2O$, α-FeOOH, $H_3PO_3$ and $H_3PO_4$ (stoichiometric, 2 h stirring, additional carbon black leads to about 4.5 weight-% of carbon)

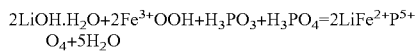

In a 5 L-glass-reactor 3 L of water are placed at room temperature under stirring. 31.27 g carbon black (Timcal Super P Li, Timcal Deutschland GmbH, D-40212 Dusseldorf, Germany) are added to the water, wherein the carbon black swims on the surface. Subsequently, 150 ml aqueous $H_2O_2$-solution (30%, Merck GmbH, D-64293 Darmstadt, Germany) are added dropwise under stirring, wherein the carbon black disperses in water. The black, aqueous carbon black dispersion obtained is added under stirring to 2800 ml water having room temperature, being in a 10 L-glass-reactor which is heatable from the outside. The mixture obtained is heated to 60° C. under streaming $N_2$ (50 NL/h) and is hold at this temperature for two hours. Under stirring 174.97 g $LiOH.H_2O$ (57.49% LiOH, 4.2 mol Li, Chemetall GmbH, D-60487 Frankfurt, Germany) are added to this mixture being tempered to 60° C. To the resulting mixture 366.20 g α-FeOOH (61.0% Fe, BET=14 m²/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. The resulting suspension is heated to 90° C. Subsequently, 167.34 g $H_3PO_3$ (98%, 2 mol P, Acros Organics, B-2440 Geel, Belgium) are added during 0.5 minutes. After 20 minutes of further stirring, 230.58 g $H_3PO_4$ (85%, 2 Mol P, Riedel-de-Haen, D-30926 Seelze) are added. The suspension obtained is further stirred for two hours while $N_2$-streaming is maintained. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz glass bubble under streaming nitrogen (15 NL/h) in a laboratory rotary furnace (BASF) and heated in one hour to an end temperature T, is hold at this temperature T for one hour and is subsequently cooled to room temperature under streaming $N_2$.

Example 7.1

The end temperature T of 750° C. gives rise to a powder having a BET-surface of 5.0 m²/g. The X-ray powder diffraction pattern shows a single phase with the crystal structure of orthorhombic $LiFePO_4$ (triphylite). The oxidation state is acquired according to example 1.1 and is $Fe_{ox}=2.01$. Chemical composition of the lithium-iron-phosphate obtained shows $Li_{1.04}Fe(PO_4)_{0.99}$. The amount of carbon is 4.5% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 200-600 nm. The very fine carbon black that has been introduced is present in a part of cavities between the primary particles within the spherical agglomerates.

Example 8

$LiFePO_4$ from $LiOH.H_2O$, α-FeOOH, $H_3PO_3$ and $H_3PO_4$ (stoichiometric, 2 h stirring, additional carbon black leads to about 6 weight-% of carbon)

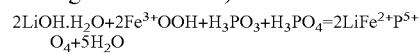

The reaction is conducted in accordance with example 7. In spite of 31.27 g carbon black, 43.96 g carbon black (Timcal Super P Li, Timcal Deutschland GmbH, D-40212 Dusseldorf, Germany) are added.

Example 8.1

The end temperature T of 700° C. gives rise to a powder having a BET-surface of 7.1 m²/g. The X-ray powder diffraction pattern shows a single phase with the crystal structure of orthorhombic $LiFePO_4$ (triphylite). The oxidation state is acquired according to example 1.1 and is $Fe_{ox}=2.01$. Chemical composition of the lithium-iron-phosphate obtained shows $Li_{1.06}Fe(PO_4)_{0.99}$. The amount of carbon is 6.3% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 200-600 nm. The very fine carbon black that has been introduced is present in a part of cavities between the primary particles within the spherical agglomerates.

Example 8.2

The end temperature T of 750° C. gives rise to a powder having a BET-surface of 6.4 m²/g. The X-ray powder diffraction pattern shows a single phase with the crystal structure of orthorhombic $LiFePO_4$ (triphylite). The oxidation state is acquired according to example 1.1 and is $Fe_{ox}=2.01$. Chemical composition of the lithium-iron-phosphate obtained shows $Li_{1.05}Fe(PO_4)_{0.99}$. The amount of carbon is 6.3% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 200-600 nm. The very fine carbon black that has been introduced is present in a part of cavities between the primary particles within the spherical agglomerates.

Example 9

$LiFePO_4$ from $LiOH.H_2O$, α-FeOOH, $H_3PO_3$ and $H_3PO_4$ (stoichiometric, 2 h stirring, additional carbon black leads to about 9 weight-% of carbon)

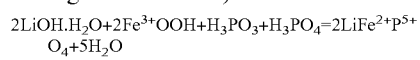

The reaction is conducted in accordance with example 7. In spite of 31.27 g carbon black, 62.55 g carbon black (Timcal Super P Li, Timcal Deutschland GmbH, D-40212 Dusseldorf, Germany) are added.

Example 9.1

The end temperature T of 700° C. gives rise to a powder having a BET-surface of 8.6 m²/g. The X-ray powder diffraction pattern shows a single phase with the crystal structure of orthorhombic $LiFePO_4$ (triphylite). The oxidation state is acquired according to example 1.1 and is $Fe_{ox}=2.01$. Chemical composition of the lithium-iron-phosphate obtained shows $Li_{1.05}Fe(PO_4)_{0.99}$. The amount of carbon is 8.7% by weight. Scanning electron microscopy shows that the powder has a spherical habitus having a medium spherical size of about 30 μm. The single sphericals consist of primary particles of $LiFePO_4$, wherein cavities are between the primary particles. The diameter of the primary particles is about 200-600 nm. The very fine carbon black that has been introduced is present in a part of cavities between the primary particles within the spherical agglomerates.

Example 9.2

The end temperature T of 750° C. gives rise to a powder having a BET-surface of 7.0 m²/g. The X-ray powder diffraction pattern shows a single phase with the crystal structure of orthorhombic LiFePO$_4$ (triphylite). The oxidation state is acquired according to example 1.1 and is Fe$_{ox}$=2.01. Chemical composition of the lithium-iron-phosphate obtained shows Li$_{1.06}$Fe(PO$_4$)$_{1.00}$. The amount of carbon is 8.7% by weight. Scanning electron microscopy shows that the powder has a spherical habitus having a medium spherical size of about 30 μm. The single sphericals consist of primary particles of LiFePO$_4$, wherein cavities are between the primary particles. The diameter of the primary particles is about 200-600 nm. The very fine carbon black that has been introduced is present in a part of cavities between the primary particles within the spherical agglomerates.

Example 10

LiFePO$_4$ from LiOH.H$_2$O, α-FeOOH, H$_3$PO$_3$ and H$_3$PO$_4$ (stoichiometric, 2 h stirring, in situ-pyrolysis of additional succhrose and additional carbon black (3.4%) lead to about 6 weight-% of carbon)

$$2\text{LiOH.H}_2\text{O} + 2\alpha\text{-Fe}^{3+}\text{OOH} + 1.06\text{H}_3\text{PO}_3 + 0.94\text{H}_3\text{PO}_4 \longrightarrow 2\text{LiFe}^{2+}\text{P}^{5+}\text{O}_4$$

In a 5 L-glass-reactor 3 L of water are placed at room temperature under stirring. 22.59 g carbon black (Timcal Super P Li, Timcal Deutschland GmbH, D-40212 Düsseldorf, Germany) are added to the water, wherein the carbon black swims on the surface. Subsequently, 150 ml aqueous H$_2$O$_2$-solution (30%, Merck GmbH, D-64293 Darmstadt, Germany) are added drop wise under stirring, wherein the carbon black disperses in water. The black, aqueous carbon black dispersion obtained is added under stirring to 2850 ml water having room temperature, being in a 10 L-glass-reactor which is heatable from the outside. The mixture obtained is heated to 60° C. under streaming N$_2$ (50 NL/h) and is hold at this temperature for two hours. Under stirring 174.97 g LiOH H$_2$O (57.49% LiOH, 4.2 mol Li, Chemetall GmbH, D-60487 Frankfurt, Germany) are added to this mixture being tempered to 60° C. To the resulting mixture 366.20 g α-FeOOH (61.0% Fe, BET=14 m$^2$/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an averade needle-length of 1 μm and an average needle-diameter of 100-200 nm in the transmission electron microscopy. The resulting suspension is heated to 90° C. Subsequently, 167.34 g H$_3$PO$_3$ (98%, 2 mol P, Acros Organics, B-2440 Geel, Belgium) are added. After 20 minutes of further stirring, 230.58 g H$_3$PO$_4$ (85%, 2 Mol P, Riedel-de-Haen, D-30926 Seelze) and 89.62 g saccharose (succhrose, C$_{12}$O$_{11}$H$_{22}$, 0.26 mol, Riedel-de-Haen, D-30962 Germany) are added and dissolved under stirring. The suspension obtained is further stirred for two hours at 90° C. while N$_2$-streaming is maintained. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz-glass-bubble under streaming nitrogen (15 NL/h) in a laboratory rotary furnace (BASF) and heated in one hour to an end temperature T, is hold at this temperature T for one hour and is subsequently cooled to room temperature under streaming N$_2$.

Example 10.1

The end temperature T of 700° C. gives rise to a powder having a BET-surface of 33.9 m$^2$/g. The X-ray powder diffraction pattern shows a single phase with the crystal structure of orthorhombic LiFePO$_4$ (triphylite). The oxidation state is acquired according to example 1.1 and is Fe$_{ox}$=2.01. Chemical composition of the lithium-iron-phosphate obtained shows Li$_{1.05}$Fe(PO$_4$)$_{1.00}$. The amount of carbon is 6.1% by weight. Scanning electron microscopy shows that the powder has a spherical habitus having a medium spherical size of about 30 μm. The single sphericals consist of primary particles of LiFePO$_4$, wherein cavities are between the primary particles. The very fine carbon black that has been introduced is present in a part of cavities between the primary particles within the spherical agglomerates.

Example 10.2

The end temperature T of 750° C. gives rise to a powder having a BET-surface of 15.1 m$^2$/g. The X-ray powder diffraction pattern shows a single phase with the crystal structure of orthorhombic LiFePO$_4$ (triphylite). The oxidation state is acquired according to example 1.1 and is Fe$_{ox}$=2.00. Chemical composition of the lithium-iron-phosphate obtained shows Li$_{1.04}$Fe(PO$_4$)$_{0.99}$. The amount of carbon is 5.7% by weight. Scanning electron microscopy shows that the powder has a spherical habitus having a medium spherical size of about 30 μm. The single sphericals consist of primary particles of LiFePO$_4$, wherein cavities are between the primary particles. The very fine carbon black that has been introduced is present in a part of cavities between the primary particles within the spherical agglomerates.

Example 11

LiFePO$_4$ from LiOH.H$_2$O, α-FeOOH, H$_3$PO$_3$ and H$_3$PO$_4$ (stoichiometric, 2 h stirring, in situ-pyrolysis of additional succhrose and additional carbon black (5.2%) lead to about 7.5 weight-% of carbon)

$$2\text{LiOH.H}_2\text{O} + 2\text{Fe}^{3+}\text{OOH} + \text{H}_3\text{PO}_3 + \text{H}_3\text{PO}_4 = 2\text{LiFe}^{2+}\text{P}^{5+}\text{O}_4 + 5\text{H}_2\text{O}$$

The reaction is conducted according to example 10. Instead of 22.59 g of carbon black and 89.62 g saccharose, 35.13 g carbon black and 94.21 g saccharose are added.

Example 11.1

The end temperature T of 700° C. gives rise to a powder having a BET-surface of 23.9 m$^2$/g. The X-ray powder diffraction pattern shows the monophasic crystal structure of orthorhombic LiFePO$_4$ (triphylite). The oxidation state is acquired according to example 1.1 and is Fe$_{ox}$=2.01. Chemical composition of the lithium-iron-phosphate obtained shows Li$_{1.05}$Fe(PO$_4$)$_{0.99}$. The amount of carbon is 7.7% by weight. Scanning electron microscopy shows that the powder has a spherical habitus having a medium spherical size of about 30 μm. The single sphericals consist of primary particles of LiFePO$_4$, wherein cavities are between the primary particles. The very fine carbon black that has been introduced is present in a part of cavities between the primary particles within the spherical agglomerates.

Example 11.2

Figure 5:
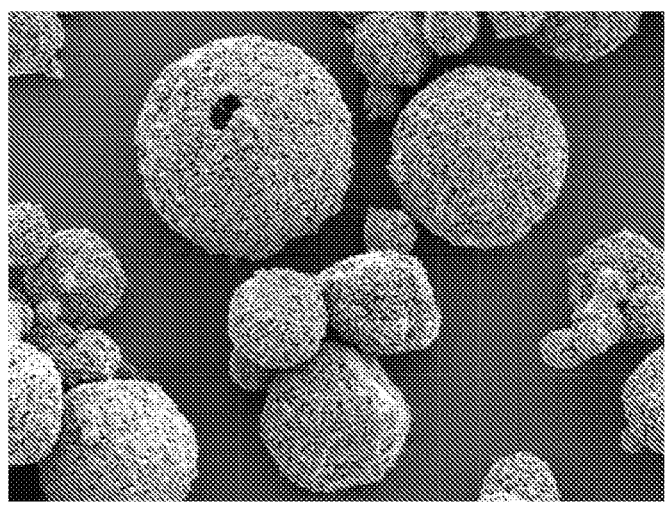
Figure 5:
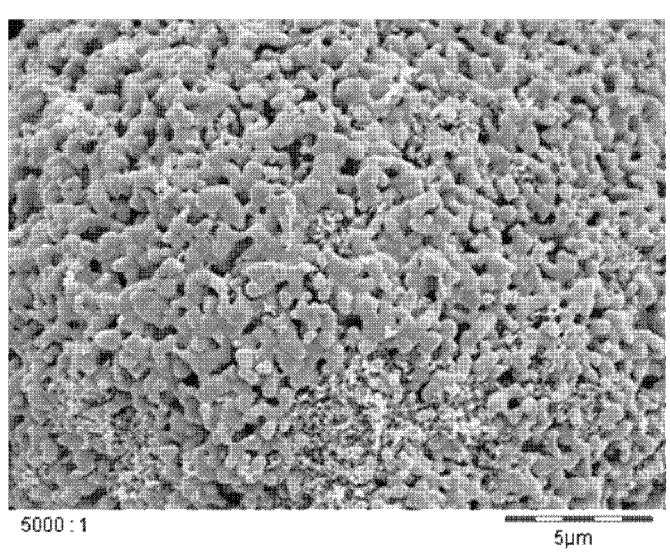
Figure 5:
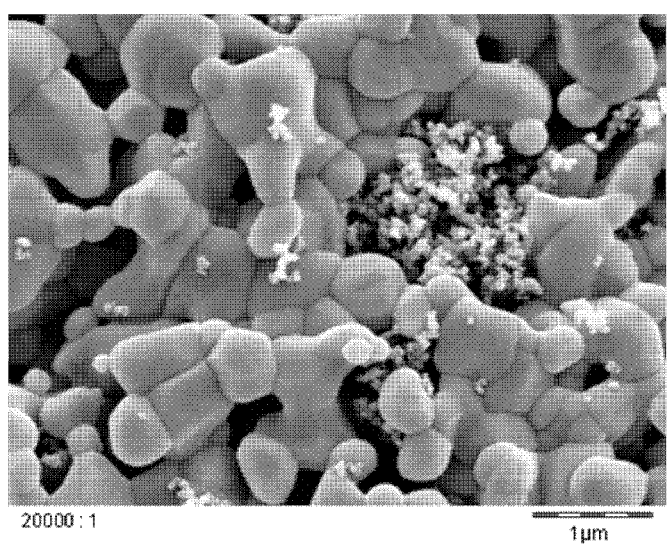

The end temperature T of 750° C. gives rise to a powder having a BET-surface of 21.9 m$^2$/g. The X-ray powder diffraction pattern shows a single phase with the crystal structure of orthorhombic LiFePO$_4$ (triphylite). The oxidation state is acquired according to example 1.1 and is Fe$_{ox}$=2.01. Chemical composition of the lithium-iron-phosphate obtained shows Li$_{1.06}$Fe(PO$_4$)$_{1.00}$. The amount of carbon is 7.4% by weight. Scanning electron microscopy shows that the powder has a spherical habitus having a medium spherical size of about 30 μm. The single sphericals consist of primary particles of LiFePO$_4$, wherein cavities are between the primary particles (FIG. 5). The very fine carbon black that has been introduced is present in a part of cavities between the primary particles within the spherical agglomerates.

Example 12

LiFePO$_4$ from LiOH.H$_2$O, α-FeOOH, H$_3$PO$_3$ and H$_3$PO$_4$ (stoichiometric, 2 h stirring, in situ-pyrolysis of additional succhrose and additional carbon black (6.9%) lead to about 12 weight-% of carbon)

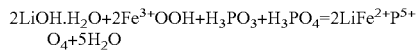

The reaction is conducted according to example 10. Instead of 22.59 g of carbon black and 89.62 g saccharose, 49.23 g carbon black and 180.33 g saccharose are added.

Example 12.1

The end temperature T of 700° C. gives rise to a powder having a BET-surface of 41.3 m$^2$/g. The X-ray powder diffraction pattern shows a single phase with the crystal structure of orthorhombic LiFePO$_4$ (triphylite). The oxidation state is acquired according to example 1.1 and is Fe$_{ox}$=2.01. Chemical composition of the lithium-iron-phosphate obtained shows Li$_{1.04}$Fe(PO$_4$)$_{0.99}$. The amount of carbon is 12.4% by weight. Scanning electron microscopy shows that the powder has a spherical habitus having a medium spherical size of about 30 μm. The single sphericals consist of primary particles of LiFePO$_4$, wherein cavities are between the primary particles. The very fine carbon black that has been introduced is present in a part of cavities between the primary particles within the spherical agglomerates.

Example 12.2

The end temperature T of 750° C. gives rise to a powder having a BET-surface of 35.0 m$^2$/g. The X-ray powder diffraction pattern shows a single phase with the crystal structure of orthorhombic LiFePO$_4$ (triphylite). The oxidation state is acquired according to example 1.1 and is Fe$_{ox}$=2.01. Chemical composition of the lithium-iron-phosphate obtained shows Li$_{1.05}$Fe(PO$_4$)$_{1.00}$. The amount of carbon is 12.2% by weight. Scanning electron microscopy shows that the powder has a spherical habitus having a medium spherical size of about 30 μm. The single sphericals consist of primary particles of LiFePO$_4$, wherein cavities are between the primary particles. The very fine carbon black that has been introduced is present in a part of cavities between the primary particles within the spherical agglomerates.

Example 13

LiFePO$_4$ from LiOH.H$_2$O, α-FeOOH, H$_3$PO$_3$ and H$_3$PO$_4$ (stoichiometric, 2 h stirring, in situ-pyrolysis of additional succhrose and additional carbon black (9.7%) lead to about 15 weight-% of carbon)

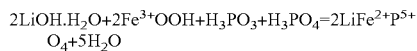

In a 5 L-glass-reactor 3 L of water are placed at room temperature under stirring. 70.27 g carbon black (Timcal Super P Li, Timcal Deutschland GmbH, D-40212 Dusseldorf, Germany) are added to the water, wherein the carbon black swims on the surface. Subsequently, 150 ml aqueous H$_2$O$_2$-solution (30%, Merck GmbH, D-64293 Darmstadt, Germany) are added drop wise under stirring, wherein the carbon black disperses in water. The black, aqueous carbon black dispersion obtained is added under stirring to 2750 ml water having room temperature, being in a 10 L-glass-reactor which is heatable from the outside. The mixture obtained is heated to 60° C. under streaming N$_2$ (50 NL/h) and is hold at this temperature for two hours. Under stirring 174.97 g LiOH.H$_2$O (57.49% LiOH, 4.2 mol Li, Chemetall GmbH, D-60487 Frankfurt, Germany) are added to this mixture being tempered to 60° C. To the resulting mixture 366.20 g α-FeOOH (61.0% Fe, BET=14 m$^2$/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. The resulting suspension is heated to 90° C. Subsequently, 167.34 g H$_3$PO$_3$ (98%, 2 mol P, Acros Organics, B-2440 Geel, Belgium) are added. After 20 minutes of further stirring, 230.58 g H$_3$PO$_4$ (85%, 2 Mol P, Riedel-de-Haen, D-30926 Seelze) and 185.85 g saccharose (succhrose, C$_{12}$O$_{11}$H$_{22}$, 0.55 mol, Riedel-de-Haen, D-30962 Germany) are added and dissolved under stirring. The suspension obtained is further stirred for two hours at 90° C. while N$_2$-streaming is maintained. The aqueous suspension obtained is stirred for 16 hours at 90° C. under streaming nitrogen. The yellow suspension is subsequently spray-dried under nitrogen in a spray-dryer (type Minor MM, Fa. Niro, Danmark) (temperature at the inlet=330° C., temperature at the outlet=106° C.).

50 g of the obtained spray-powder are subsequently added to a continuously rotating (7 rpm) 1 L-quartz-glass-bubble under streaming nitrogen (15 NL/h) in a laboratory rotary furnace (BASF) and heated in one hour to an end temperature T, is hold at this temperature T for one hour and is subsequently cooled to room temperature under streaming N$_2$.

Example 13.1

The end temperature T of 700° C. gives rise to a powder having a BET-surface of 42.9 m$^2$/g. The X-ray powder diffraction pattern shows a single phase with the crystal structure of orthorhombic LiFePO$_4$ (triphylite). The oxidation state is acquired according to example 1.1 and is Fe$_{ox}$=2.01. Chemical composition of the lithium-iron-phosphate obtained shows Li$_{1.06}$Fe(PO$_4$)$_{1.00}$. The amount of carbon is 14.7% by weight. Scanning electron microscopy shows that the powder has a spherical habitus having a medium spherical size of about 30 μm. The single sphericals consist of primary particles of LiFePO$_4$, wherein cavities are between the primary particles. The very fine carbon black that has been introduced is present in a part of cavities between the primary particles within the spherical agglomerates.

Example 13.2

The end temperature T of 750° C. gives rise to a powder having a BET-surface of 39.0 m$^2$/g. The X-ray powder diffraction pattern shows a single phase with the crystal structure of orthorhombic LiFePO$_4$ (triphylite). The oxidation state is acquired according to example 1.1 and is Fe$_{ox}$=2.01. Chemical composition of the lithium-iron-phosphate obtained shows Li$_{1.06}$Fe(PO$_4$)$_{0.99}$. The amount of carbon is 14.6% by weight. Scanning electron microscopy shows that the powder has a spherical habitus having a medium spherical size of about 30 μm. The single sphericals consist of primary particles of LiFePO$_4$, wherein cavities are between the primary particles. The very fine carbon black that has been introduced is present in a part of cavities between the primary particles within the spherical agglomerates.

Example 14

LiFePO$_4$ from LiOH.H$_2$O, α-FeOOH, H$_3$PO$_3$ and H$_3$PO$_4$ (stoichiometric, 2 h stirring, additional carbon black (SPLi+KS06+EN350=3/2/1) leads to about 10 weight-% of carbon)

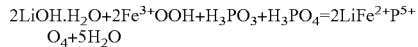

$$2\text{LiOH.H}_2\text{O} + 2\text{Fe}^{3+}\text{OOH} + \text{H}_3\text{PO}_3 + \text{H}_3\text{PO}_4 = 2\text{LiFe}^{2+}\text{P}^{5+}\text{O}_4 + 5\text{H}_2\text{O}$$

In a 5 L-glass-reactor 3 L of water are placed at room temperature under stirring. 37.48 g carbon black (Timcal Super P Li, Timcal Deutschland GmbH, D-40212 Dusseldorf, Germany), 12.5 g carbon black (Ensago 350 PWD, Timcal Deutschland GmbH, D-40212 Dusseldorf, Germany) and 25.0 g graphite powder (Timrex KS 6, Timcal Deutschland GmbH, D-40212 Dusseldorf, Germany) are added to the water, wherein the added carbon swims on the surface. Subsequently, 300 ml aqueous H$_2$O$_2$-solution (30%, Merck GmbH, D-64293 Darmstadt, Germany) are added drop wise under stirring, wherein the carbon disperses in water. The black, aqueous carbon dispersion obtained is added under stirring to 2700 ml water having room temperature, being in a 10 L-glass-reactor which is heatable from the outside. The mixture obtained is heated to 60° C. under streaming N$_2$ (50 NL/h) and is hold at this temperature for two hours. Under stirring 174.97 g LiOH.H$_2$O (57.49% LiOH, 4.2 mol Li, Chemetall GmbH, D-60487 Frankfurt, Germany) are added to this mixture being tempered to 60° C. To the resulting mixture 366.20 g α-FeOOH (61.0% Fe, BET=14 m$^2$/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. The resulting suspension is heated to 90° C. Subsequently, 167.34 g H$_3$PO$_3$ (98%, 2 mol P, Acros Organics, B-2440 Geel, Belgium) are added. After 20 minutes of further stirring, 230.58 g H$_3$PO$_4$ (85%, 2 Mol P, Riedel-de-Haen, D-30926 Seelze) are added. The suspension obtained is further stirred for two hours at 90° C. while N$_2$-streaming is maintained. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz-glass-bubble under streaming nitrogen (15 NL/h) in a laboratory rotary furnace (BASF) and heated in one hour to an end temperature T, is hold at this temperature T for one hour and is subsequently cooled to room temperature under streaming N$_2$.

Example 14.1

The end temperature T of 500° C. gives rise to a powder having a BET-surface of 18.6 m$^2$/g. The X-ray powder diffraction pattern shows a single phase with the crystal structure of orthorhombic LiFePO$_4$ (triphylite), in addition the X-ray powder diffraction pattern shows the presence of graphite. The oxidation state is acquired according to example 1.1 and is Fe$_{ox}$=2.04. Chemical composition of the lithium-iron-phosphate obtained shows Li$_{1.06}$Fe(PO$_4$)$_{1.00}$. The amount of carbon is 10.4% by weight. Scanning electron microscopy shows that the powder has a spherical habitus having a medium spherical size of about 30 μm. The single sphericals consist of primary particles of LiFePO$_4$, wherein cavities are between the primary particles.

Example 15 (comparative example to example 14)

LiFePO$_4$ from LiOH.H$_2$O, α-FeOOH and H$_3$PO$_4$ (stoichiometric, 2 h stirring, additional carbon black (SPLi+KS06+EN350=3/2/1) leads to about 10 weight-% of carbon)

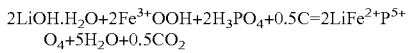

$$2\text{LiOH.H}_2\text{O} + 2\text{Fe}^{3+}\text{OOH} + 2\text{H}_3\text{PO}_4 + 0.5\text{C} = 2\text{LiFe}^{2+}\text{P}^{5+}\text{O}_4 + 5\text{H}_2\text{O} + 0.5\text{CO}_2$$

In a 5 L-reactor 3 L of water are placed at room temperature under stirring. 37.48 g carbon black (Timcal Super P Li, Timcal Deutschland GmbH, D-40212 Dusseldorf, Germany), 12.5 g carbon black (Ensago 350 PWD, Timcal Deutschland GmbH, D-40212 Dusseldorf, Germany) and 25.0 g graphite powder (Timrex KS 6, Timcal Deutschland GmbH, D-40212 Dusseldorf, Germany) are added to the water, wherein the added carbon swims on the surface. Subsequently, 300 ml aqueous H$_2$O$_2$-solution (30%, Merck GmbH, D-64293 Darmstadt, Germany) are added drop wise under stirring, wherein the carbon disperses in water. The black, aqueous carbon dispersion obtained is added under stirring to 2700 ml water having room temperature, being in a 10 L-glass-reactor which is heatable from the outside. The mixture obtained is heated to 60° C. under streaming N$_2$ (50 NL/h) and is hold at this temperature for two hours. Under stirring 174.97 g LiOH.H$_2$O (57.49% LiOH, 4.2 mol Li, Chemetall GmbH, D-60487 Frankfurt, Germany) are added to this mixture being tempered to 60° C. To the resulting mixture 366.20 g α-FeOOH (61.0% Fe, BET=14 m$^2$/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. The resulting suspension is heated to 90° C. Subsequently, 461.18 g H$_3$PO$_4$ (85%, 4 Mol P, Riedel-de-Haen, D-30926 Seelze) are added. The suspension obtained is further stirred for two hours at 90° C. while N$_2$-streaming is maintained. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz-glass-bubble under streaming nitrogen (15 NL/h) in a laboratory rotary furnace (BASF) and heated in one hour to an end temperature T, is hold at this temperature T for one hour and is subsequently cooled to room temperature under streaming N$_2$.

Example 15.1

The end temperature T of 500° C. gives rise to a powder having a BET-surface of 25.4 m$^2$/g. The X-ray powder diffraction pattern shows a mixture of monocline Li$_3$Fe$_2$(PO$_4$)$_3$ [powder diffraction pattern 00-040-1499 of the international centre of diffraction data (ICDD)] and α-Fe$_2$O$_3$. In addition the X-ray powder diffraction pattern shows the presence of graphite. The oxidation state is acquired according to example 1.1 and is $Fe_{ox}$=2.90. The chemical composition of the powder obtained shows $Li_{1.06}Fe(PO_4)_{1.00}$. The amount of carbon is 10.4% by weight.

Example 16

LiFePO$_4$ from LiOH.H$_2$O, α-FeOOH and H$_3$PO$_3$ (stoichiometric, 16 h stirring, no H$_3$PO$_4$)

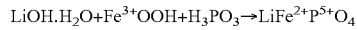

In a 10 L-glass-reactor which is heatable from the outside, 6 L water are placed at 80° C. under streaming N$_2$ (50 NL/h). The streaming N$_2$-cover is maintained during the further process. Under stirring 174.97 g LiOH.H$_2$O (57.49% LiOH, 4.2 mol Li, Chemetall GmbH, D-60487 Frankfurt, Germany) are added and dissolved to give a clear, colourless solution. 366.20 g α-FeOOH (61.0% Fe, Bet=14 m$^2$/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. 334.69 g H$_3$PO$_3$ (98%, 2 mol P, Acros Organics, B-2440 Geel, Belgium) are added to the amber aqueous suspension during 3 minutes. The aqueous suspension obtained is stirred for 16 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz-glass-bubble under streaming nitrogen (15 NL/h) in a laboratory rotary furnace (BASF) and heated in one hour to an end temperature T, is hold at this temperature T for one hour and is subsequently cooled to room temperature under streaming N$_2$.

Example 16.1

The end temperature T of 400° C. gives rise to a powder having a BET-surface of 18.5 m$^2$/g and an X-ray powder diffraction pattern, showing a single phase with the crystal structure of orthorhombic LiFePO$_4$ (triphylite). Chemical analysis shows the composition $Li_{1.06}Fe(PO_4)_{1.00}$. Analysis of the oxidation state of Fe is conducted according to example 1.1 and is determined to $Fe_{ox}$=2.01. Scanning electron microscopy shows that the powder has a spherical habitus having a medium spherical size of about 30 μm. The single sphericals consist of primary particles of LiFePO$_4$, wherein cavities are between the primary particles.

Example 16.2

The end temperature T of 450° C. gives rise to a powder having a BET-surface of 21.2 m$^2$/g and an X-ray powder diffraction pattern, showing a single phase with the crystal structure of orthorhombic LiFePO$_4$ (triphylite). Chemical analysis shows the composition $Li_{1.05}Fe(PO_4)_{1.00}$. Analysis of the oxidation state of Fe is conducted according to example 1.1 and is determined to $Fe_{ox}$=2.01. Scanning electron microscopy shows that the powder has a spherical habitus having a medium spherical size of about 30 μm. The single sphericals consist of primary particles of LiFePO$_4$, wherein cavities are between the primary particles.

Example 16.3

The end temperature T of 500° C. gives rise to a powder having a BET-surface of 9.6 m$^2$/g and an X-ray powder diffraction pattern, showing a single phase with the crystal structure of orthorhombic LiFePO$_4$ (triphylite). Analysis of the oxidation state of Fe is conducted according to example 1.1 and is determined to $Fe_{ox}$=2.01. Scanning electron microscopy shows that the powder has a spherical habitus having a medium spherical size of about 30 μm. The single sphericals consist of primary particles of LiFePO$_4$, wherein cavities are between the primary particles.

Example 16.4

The end temperature T of 600° C. gives rise to a powder having a BET-surface of 6.8 m$^2$/g and an X-ray powder diffraction pattern, showing a single phase with the crystal structure of orthorhombic LiFePO$_4$ (triphylite). Chemical analysis shows the composition $Li_{1.06}Fe(PO_4)_{1.00}$. Analysis of the oxidation state of Fe is conducted according to example 1.1 and is determined to $Fe_{ox}$=2.01. Scanning electron microscopy shows that the powder has a spherical habitus having a medium spherical size of about 30 μm. The single sphericals consist of primary particles of LiFePO$_4$, wherein cavities are between the primary particles.

Example 16.5

The end temperature T of 700° C. gives rise to a powder having a BET-surface of 3.6 m$^2$/g and an X-ray powder diffraction pattern, showing a single phase with the crystal structure of orthorhombic LiFePO$_4$ (triphylite). Chemical analysis shows the composition $Li_{1.06}Fe(PO_4)_{1.01}$. Analysis of the oxidation state of Fe is conducted according to example 1.1 and is determined to $Fe_{ox}$=2.01. Scanning electron microscopy shows that the powder has a spherical habitus having a medium spherical size of about 30 μm. The single sphericals consist of primary particles of LiFePO$_4$, wherein cavities are between the primary particles.

Example 16.6

The end temperature T of 750° C. gives rise to a powder having a BET-surface of 1.6 m$^2$/g and an X-ray powder diffraction pattern, showing a single phase with the crystal structure of orthorhombic LiFePO$_4$ (triphylite). Chemical analysis shows the composition $Li_{1.05}Fe(PO_4)_{1.01}$. Analysis of the oxidation state of Fe is conducted according to example 1.1 and is determined to $Fe_{ox}$=2.01. Scanning electron microscopy shows that the powder has a spherical habitus having a medium spherical size of about 30 μm. The single sphericals consist of primary particles of LiFePO$_4$, wherein cavities are between the primary particles.

Example 17

LiFePO$_4$ from LiOH.H$_2$O, γ-FeOOH, H$_3$PO$_3$ and H$_3$PO$_4$ (stoichiometric, 60 h stirring)

$$2LiOH.H_2O+2Fe^{3+}OOH+H_3PO_3+H_3PO_4=2LiFe^{2+}P^{5+}O_4+5H_2O$$

In a 10 L-glass-reactor which is heatable from the outside, 6 L water are placed at 80° C. under streaming N$_2$ (50 NL/h). The streaming N$_2$-cover is maintained during the further process. Under stirring 174.97 g LiOH.H$_2$O (57.49% LiOH, 4.2 mol Li, Chemetall GmbH, D-60487 Frankfurt, Germany) are added and dissolved to give a clear, colourless solution. 378.71 g γ-FeOOH (59.0% Fe, BET=77 m$^2$/g, 4.0 mol Fe; ZMAG-5100, CATHAY PIGMENTS (USA) Inc., 4901 Evans Ave., Valparaiso, Ind. 46383, USA) are added. This γ-FeOOH of the type ZMAG-5100 which is added shows a needle-shaped habitus having an average needle-length of 1 µm and a needle-diameter of 50-120 nm in the transmission electron microscopy. 167.34 g H$_3$PO$_3$ (98%, 2 mol P, Acros Organics, B-2440 Geel, Belgium) are added to the amber aqueous suspension during 0.5 minutes. Subsequently, 230.58 g H$_3$PO$_4$ (85%, 2 Mol P, Riedel-de-Haen, D-30926 Seelze) are added. The aqueous suspension obtained is stirred for 60 hours at 90° C. under streaming nitrogen. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz-glass-bubble under streaming nitrogen (15 NL/h) in a laboratory rotary furnace (BASF) and heated in one hour to an end temperature T, is hold at this temperature T for one hour and is subsequently cooled to room temperature under streaming N$_2$.

Example 17.1

The end temperature T of 300° C. gives rise to a powder having a BET-surface of 14.5 m$^2$/g. The X-ray powder diffraction pattern shows a single phase with the crystal structure of orthorhombic LiFePO$_4$ (triphylite). Chemical analysis shows the composition Li$_{1,07}$Fe (PO$_4$)$_{1,01}$. The oxidation state is acquired according to example 1.1 and is Fe$_{ox}$=2.08. Scanning electron microscopy shows that the powder has a spherical habitus having a medium spherical size of about 30 µm. The single sphericals consist of primary particles of LiFePO$_4$, wherein cavities are between the primary particles.

Example 17.2

The end temperature T of 350° C. gives rise to a powder having a BET-surface of 11.8 m$^2$/g. The X-ray powder diffraction pattern shows a single phase with the crystal structure of orthorhombic LiFePO$_4$ (triphylite). Chemical analysis shows the composition Li$_{1,05}$Fe(PO$_4$)$_{1,01}$. The oxidation state is acquired according to example 1.1 and is Fe$_{ox}$=2.03. Scanning electron microscopy shows that the powder has a spherical habitus having a medium spherical size of about 30 µm. The single sphericals consist of primary particles of LiFePO$_4$, wherein cavities are between the primary particles.

Example 17.3

The end temperature T of 450° C. gives rise to a powder having a BET-surface of 7.0 m$^2$/g. The X-ray powder diffraction pattern shows a single phase with the crystal structure of orthorhombic LiFePO$_4$ (triphylite). The oxidation state is acquired according to example 1.1 and is Fe$_{ox}$=2.02. Scanning electron microscopy shows that the powder has a spherical habitus having a medium spherical size of about 30 µm. The single sphericals consist of primary particles of LiFePO$_4$.

Example 17.4

The end temperature T of 500° C. gives rise to a single phase with the crystal structure of LiFePO$_4$ having a BET-surface of 5.9 m$^2$/g, a chemically analysed composition of Li$_{1,05}$Fe(PO$_4$)$_{1,01}$ and an oxidation state Fe$_{ox}$ of 2.01. Scanning electron microscopy shows that the powder has a spherical habitus having a medium spherical size of about 30 µm.

Example 17.5

The end temperature T of 600° C. gives rise to a single phase with the crystal structure of LiFePO$_4$ having a BET-surface of 3.5 m$^2$/g, an analysed chemical composition of Li$_{1,05}$Fe (PO$_4$)$_{1,00}$ and an oxidation state Fe$_{ox}$ of 2.01. Scanning electron microscopy shows that the powder has a spherical habitus having a medium spherical size of about 30 µm. The single sphericals consist of primary particles of LiFePO$_4$, herein medium particle diameter is about 600-1000 nm and wherein cavities are between the primary particles.

Example 17.6

The end temperature T of 700° C. gives rise to a single phase with the crystal structure of LiFePO$_4$ having a BET-surface of 1.1 m$^2$/g, a chemically analysed composition of Li$_{1,05}$Fe(PO$_4$)$_{1,02}$ and an oxidation state Fe$_{ox}$ of 2.01. Scanning electron microscopy shows a primary particle size of 0, 5-2 µm.

Example 17.7

The end temperature T of 750° C. gives rise to a single phase with the crystal structure of LiFePO$_4$ having a BET-surface of 0.5 m$^2$/g, a chemically analysed composition of Li$_{1,04}$Fe(PO$_4$)$_{1,00}$ and an oxidation state Fe$_{ox}$ of 2.01.

Example 18

Electrochemical characterization of a cathode material from this invention

Cathode material from example 12.2 that contains LiFePO$_4$ prepared at 750° C. and additional carbon which was integrated into the LiFePO$_4$ during the wet syntheses and associated calcination process at 750° C. (carbon content=about 12.2%=6.9% SPLi +5.3% C from succhrose) is processed into a cathode and electrochemically characterized.

For the preparation of the cathode 90% by weight of the cathode material together with 10% by weight of the binder PVdF-HFP (Kynar 2821, Arkema) together with an appropriate amount of the solvent NMP(N-methyl-2-pyrrolidon) are mixed intensively using an intensive mixer (Ultra-Turrax T25 basic, IKA Labortechnik, D-79219 Staufen, Germany). The resulting dispersion is degassed by rolling on a rolling machine in a closed glass vessel. The degassed dispersion is coated with a layer thickness of 250 µm on an aluminum foil. After a drying time of 1 hour at 80° C. in a vacuum drying cabinet the layer thickness is 80 µm. From this layered material electrodes are punched out with a diameter of 13 mm. For electrochemical characterization these electrodes are fastened into electrical cells. This is done in a glove-box under argon (content of oxygen and water each <1 ppm). The anode is punched out from a 750 µm thick lithium foil (Sigma-Aldrich Chemie GmbH, CH-9571 Buchs SG, Switzerland). A non-woven of glass fibers with a thickness of 1 mm is used as separator. The electrolyte is a mixture (1:1) of dimethyl carbonate and ethylene carbonate with a content of 1 mol/L lithium hexafluorophosphate LiPF$_6$ (Ferro Corp., Cleveland, USA).

The electrical cell is built in a measuring apparatus and cycled with the following parameters:

Charging up to a cell voltage of 4 V by 19 mA/g in the first 4 clycles and by 39 mA/g in the following cycles.

Discharging to a cell voltage of 2.5 V by 19 mA/g in the first 4 cycles, 39 mA/g in the following 5 cycles, 77 mA/g in the 10th cycle, 155 mA/g in the 11th cycle, 309 mA/g in the 12th cycle, 618 mA/g in the 13th cycle, 1256 mA/g in the 14th cycle, 19 mA/g in the next two cycles and 39 mA/g in the last 4 cycles.

The results of the electrochemical characterization are shown in the following table.

| Cycle number | Discharge capacity [mAh/g] | Current density [mA/g] |
| --- | --- | --- |
| 1 | 154.68 | 19 |
| 2 | 155.18 | 19 |
| 3 | 155.45 | 19 |
| 4 | 155.52 | 19 |
| 5 | 150.78 | 39 |
| 6 | 150.80 | 39 |
| 7 | 150.82 | 39 |
| 8 | 150.84 | 39 |
| 9 | 150.81 | 39 |
| 10 | 145.03 | 77 |
| 11 | 137.10 | 155 |
| 12 | 126.89 | 309 |
| 13 | 109.36 | 618 |
| 14 | 73.13 | 1256 |
| 15 | 154.99 | 19 |
| 16 | 155.24 | 19 |
| 17 | 151.27 | 39 |
| 18 | 151.07 | 39 |
| 19 | 150.91 | 39 |
| 20 | 150.64 | 39 |
| 21 | 150.41 | 39 |
| 22 | 150.13 | 39 |
| 23 | 149.84 | 39 |
| 24 | 149.61 | 39 |
| 25 | 149.36 | 39 |

All values in the table are related to the mass of the electrochemically active component in the material, $LiFePO_4$, without taking into account the incorporated carbon.

The invention claimed is:

1. A process for preparing at least one compound of formula (I)

$$Li_{a-b}M^1_b Fe_{1-c}M^2_c P_{d-e}M^3_e O_x \qquad (I),$$

wherein:
$M^1$: Na, K, Rb, and/or Cs;
$M^2$: Mn, Mg, Ca, Ti, Co, Ni, Cr, and/or V;
$M^3$: Si and/or S;
a: 0.8-1.9;
b: 0-0.3;
c: 0-0.9;
d: 0.8-1.9;
e: 0-0.5;
x: 1.0-8, depending on an amount and oxidation state of Li, $M^1$, Fe, $M^2$, P, $M^3$, wherein compounds of formula (I) are neutrally charged,
comprising
(A) mixing at least one lithium-comprising compound, at least one iron-comprising compound, in which iron has the oxidation state +3, and at least one selected from the group consisting of an $M^1$-comprising compound, an $M^2$-comprising compound, and an $M^3$-comprising compound, and at least one reducing agent which is oxidized to at least one compound comprising at least one phosphorous atom in oxidation state +5, to give a mixture;
(B) optionally, drying the mixture obtained in (A), in order to obtain a solid compound; and
(C) calcining the mixture obtained in (A) or the solid compound obtained in (B) at a temperature of 300 to 1000° C.

2. The process according to claim 1, wherein the mixture obtained in (A) is essentially aqueous.

3. The process according to claim 1, wherein the mixture obtained in (A) additionally comprises at least one compound comprising at least one phosphorous atom in oxidation state +5.

4. The process according to claim 1, wherein the at least one reducing agent which is oxidized to at least one compound comprising at least one phosphorous atom in oxidation state +5 is selected from the group consisting of $H_3PO_3$, $(NH_4)H_2PO_3$, $(NH_4)_2HPO_3$, $H_3PO_2$, $(NH_4)H_2PO_2$, $(NH_4)_2HPO_2$, $LiH_2PO_3$, $Li_2HPO_3$, and $Li_2PO_2$.

5. The process according to claim 1, wherein the at least one compound comprising at least one phosphorous atom in oxidation state +5 in (A) is selected from the group consisting of $H_3PO_4$, $(NH_4)H_2PO_4$, $(NH_4)_2HPO_4$, $(NH_4)_3PO_4$, $Li_3PO_4$, $LiH_2PO_4$, and $Li_2HPO_4$.

6. The process according to claim 2, wherein the drying (B) is spray-drying.

7. The process according to claim 2, wherein the mixture obtained in (A) additionally comprises at least one compound comprising at least one phosphorous atom in oxidation state +5.

8. The process according to claim 2, wherein the at least one reducing agent which is oxidized to at least one compound comprising at least one phosphorous atom in oxidation state +5 is selected from the group consisting of $H_3PO_3$, $(NH_4)H_2PO_3$, $(NH_4)_2HPO_3$, $H_3PO_2$, $(NH_4)H_2PO_2$, $(NH_4)_2HPO_2$, $LiH_2PO_3$, $Li_2HPO_3$, and $Li_2PO_2$.

9. The process according to claim 3, wherein the at least one reducing agent which is oxidized to at least one compound comprising at least one phosphorous atom in oxidation state +5 is selected from the group consisting of $H_3PO_3$, $(NH_4)H_2PO_3$, $(NH_4)_2HPO_3$, $H_3PO_2$, $(NH_4)H_2PO_2$, $(NH_4)_2HPO_2$, $LiH_2PO_3$, $Li_2HPO_3$, and $Li_2PO_2$.

10. The process according to claim 7, wherein the at least one reducing agent which is oxidized to at least one compound comprising at least one phosphorous atom in oxidation state +5 is selected from the group consisting of $H_3PO_3$, $(NH_4)H_2PO_3$, $(NH_4)_2HPO_3$, $H_3PO_2$, $(NH_4)H_2PO_2$, $(NH_4)_2HPO_2$, $LiH_2PO_3$, $Li_2HPO_3$, and $Li_2PO_2$.

11. The process according to claim 3, wherein the at least one compound comprising at least one phosphorous atom in oxidation state +5 in (A) is selected from the group consisting of $H_3PO_4$, $(NH_4)H_2PO_4$, $(NH_4)_2HPO_4$, $(NH_4)_3PO_4$, $Li_3PO_4$, $LiH_2PO_4$, and $Li_2HPO_4$.

12. The process according to claim 7, wherein the at least one compound comprising at least one phosphorous atom in oxidation state +5 in (A) is selected from the group consisting of $H_3PO_4$, $(NH_4)H_2PO_4$, $(NH_4)_2HPO_4$, $(NH_4)_3PO_4$, $Li_3PO_4$, $LiH_2PO_4$, and $Li_2HPO_4$.

13. The process according to claim 4, wherein the at least one compound comprising at least one phosphorous atom in oxidation state +5 in (A) is selected from the group consisting of $H_3PO_4$, $(NH_4)H_2PO_4$, $(NH_4)_2HPO_4$, $(NH_4)_3PO_4$, $Li_3PO_4$, $LiH_2PO_4$, and $Li_2HPO_4$.

14. A process for preparing a mixture comprising at least one compound of formula (I)

$$Li_{a-b}M^1_b Fe_{1-c}M^2_c P_{d-e}M^3_e O_x \qquad (I),$$

wherein:
$M^1$: Na, K, Rb, and/or Cs;
$M^2$: Mn, Mg, Ca, Ti, Co, Ni, Cr, and/or V;
$M^3$: Si and/or S;
a: 0.8-1.9;
b: 0-0.3;
c: 0-0.9;
d: 0.8-1.9;
e: 0-0.5;

x: 1.0-8, depending on an amount and oxidation state of Li, $M^1$, Fe, $M^2$, P, $M^3$, wherein compounds of formula (I) are neutrally charged, and at least one electrically conducting material comprising:

(D) mixing at least one electrically conducting material or at least one precursor of
an electrically conducting material,
at least one lithium-comprising compound,
at least one iron-comprising compound, in which iron has the oxidation state +3,
at least one selected from the group consisting of an $M^1$-comprising compound, an $M^2$-comprising compound, and an $M^3$-comprising compound, and
at least one reducing agent which is oxidized to at least one compound comprising at least one phosphorous atom in oxidation state +5, to give a first mixture;

(E) optionally, drying the first mixture obtained in (D), to obtain a solid compound; and (F) calcining the first mixture obtained in (D) or the solid compound obtained in (E) at a temperature of 300 to 1000 °C.

15. The process according to claim 14, wherein the first mixture obtained in (D) additionally comprises at least one compound comprising at least one phosphorous atom in oxidation state +5.

16. The process according to claim 14, wherein the at least one reducing agent which is oxidized to at least one compound comprising at least one phosphorous atom in oxidation state +5 is selected from the group consisting of $H_3PO_3$, $(NH_4)H_2PO_3$, $(NH_4)_2HPO_3$, $H_3PO_2$, $(NH_4)H_2PO_2$, $(NH_4)_2HPO_2$, $LiH_2PO_3$, $Li_2HPO_3$, and $Li_2PO_2$.

17. The process according to claim 14, wherein the electrically conducting material is at least one selected from the group consisting of carbon black, graphite, carbon fibers, carbon nanofibers, carbon nanotubes, and an electrically conducting polymer.

* * * * *